(12) United States Patent
Mishima et al.

(10) Patent No.: US 11,100,662 B2
(45) Date of Patent: Aug. 24, 2021

(54) IMAGE PROCESSING APPARATUS, RANGING APPARATUS AND PROCESSING APPARATUS

(71) Applicant: KABUSHIKI KAISHA TOSHIBA, Tokyo (JP)

(72) Inventors: Nao Mishima, Tokyo (JP); Takayuki Sasaki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 115 days.

(21) Appl. No.: 16/295,323

(22) Filed: Mar. 7, 2019

(65) Prior Publication Data
US 2020/0051264 A1 Feb. 13, 2020

(30) Foreign Application Priority Data
Aug. 10, 2018 (JP) .............................. JP2018-151247

(51) Int. Cl.
*G06T 7/55* (2017.01)

(52) U.S. Cl.
CPC ...... *G06T 7/55* (2017.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 6,118,475 A | 9/2000 | Iijima et al. |
| 2015/0248765 A1* | 9/2015 | Criminisi ................. G06T 7/50 382/106 |
| 2016/0154152 A1 | 6/2016 | Moriuchi et al. |
| 2017/0054910 A1 | 2/2017 | Moriuchi et al. |
| 2017/0353710 A1 | 12/2017 | Sasaki et al. |
| 2019/0197667 A1* | 6/2019 | Paluri .................... G06N 3/084 |

(Continued)

FOREIGN PATENT DOCUMENTS

| JP | H8-43055 A | 2/1996 |
| JP | 2016-102733 A | 6/2016 |

(Continued)

OTHER PUBLICATIONS

Eigen et al., "Depth Map Prediction from a Single Image using a Multi-Scale Deep Network," https://arxiv.org/abs/1406.2283, pp. 1-9 (Jun. 9, 2014).

(Continued)

*Primary Examiner* — Justin P. Misleh
(74) *Attorney, Agent, or Firm* — Finnegan, Henderson, Farabow, Garrett & Dunner L.L.P.

(57) ABSTRACT

According to one embodiment, an image processing apparatus includes a memory and one or more hardware processors electrically coupled to the memory. The one or more hardware processors acquire a first image of an object including a first shaped blur and a second image of the object including a second shaped blur. The first image and the second image are acquired by capturing at a time through a single image-forming optical system. The one or more hardware processors acquire distance information to the object based on the first image and the second image, with a statistical model that has learnt previously.

10 Claims, 17 Drawing Sheets

(56) References Cited

U.S. PATENT DOCUMENTS

| | | | |
|---|---|---|---|
| 2019/0295282 A1* | 9/2019 | Smolyanskiy | G01S 13/931 |
| 2020/0143552 A1* | 5/2020 | Bao | G06T 7/50 |
| 2020/0242788 A1* | 7/2020 | Jacobs | G06T 7/50 |
| 2020/0260014 A1 | 8/2020 | Miyatani | |

FOREIGN PATENT DOCUMENTS

| | | |
|---|---|---|
| JP | 2017-40642 A | 2/2017 |
| JP | 2017-220780 A | 12/2017 |
| WO | WO 2019/073814 A1 | 4/2019 |

OTHER PUBLICATIONS

Haim et al., "Depth Estimation From a Single Image Using Deep Learned Phase Coded Mask," IEEE Transactions on Computational Imaging, vol. 4, No. 3, pp. 298-310 (Sep. 2018).

Hazirbas et al., "Deep Depth From Focus," Technical University of Munich, arXiv:1704.01085v2 [cs.CV], 16 pages (Nov. 24, 2017).

Carvalho et al., "Deep Depth from Defocus: how can defocus blur improve 3D estimation using dense neural networks?," https://arxiv.org/abs/1809.01567, pp. 1-18 (Sep. 6, 2018).

\* cited by examiner

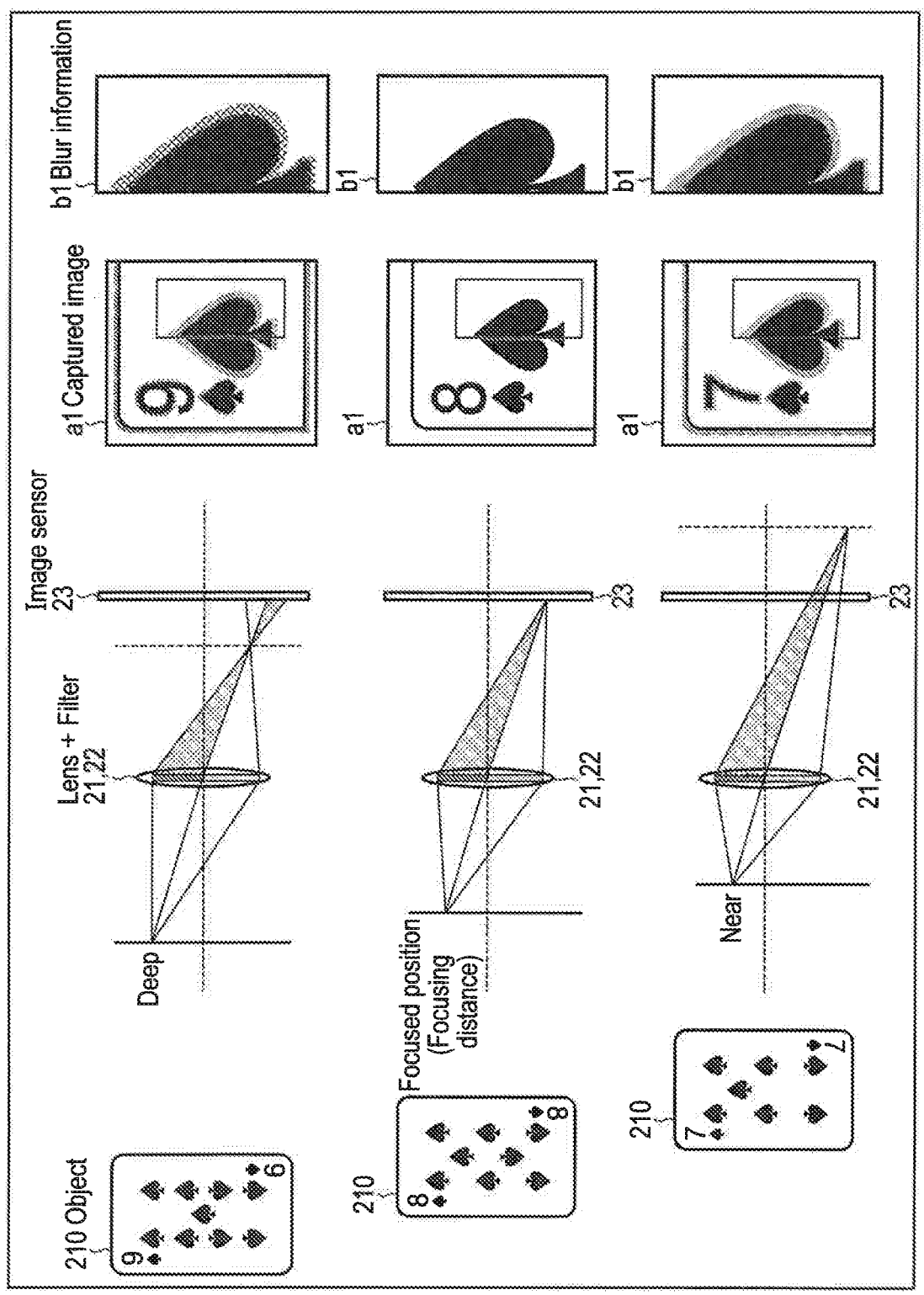
F I G. 7

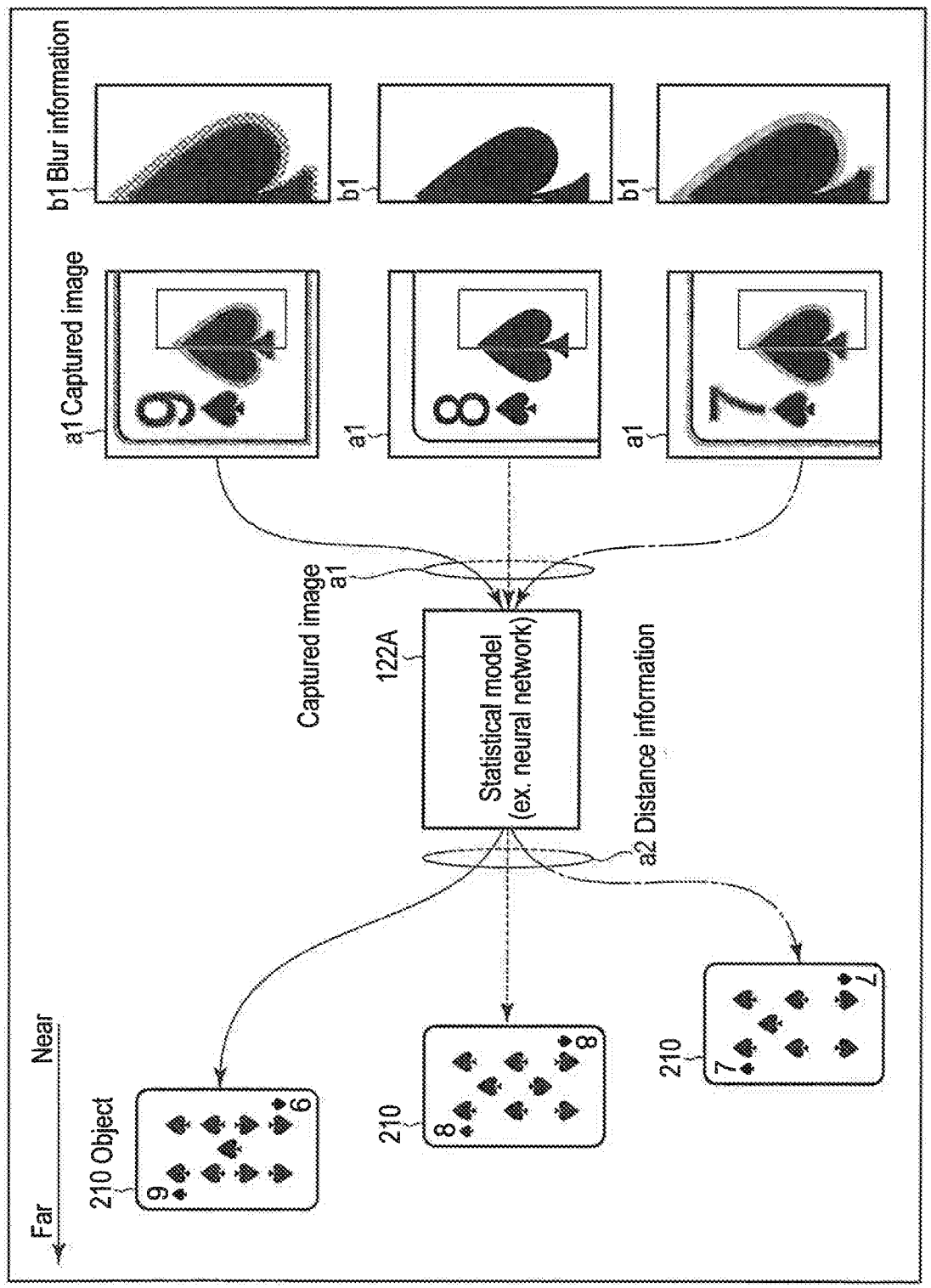
F I G. 8

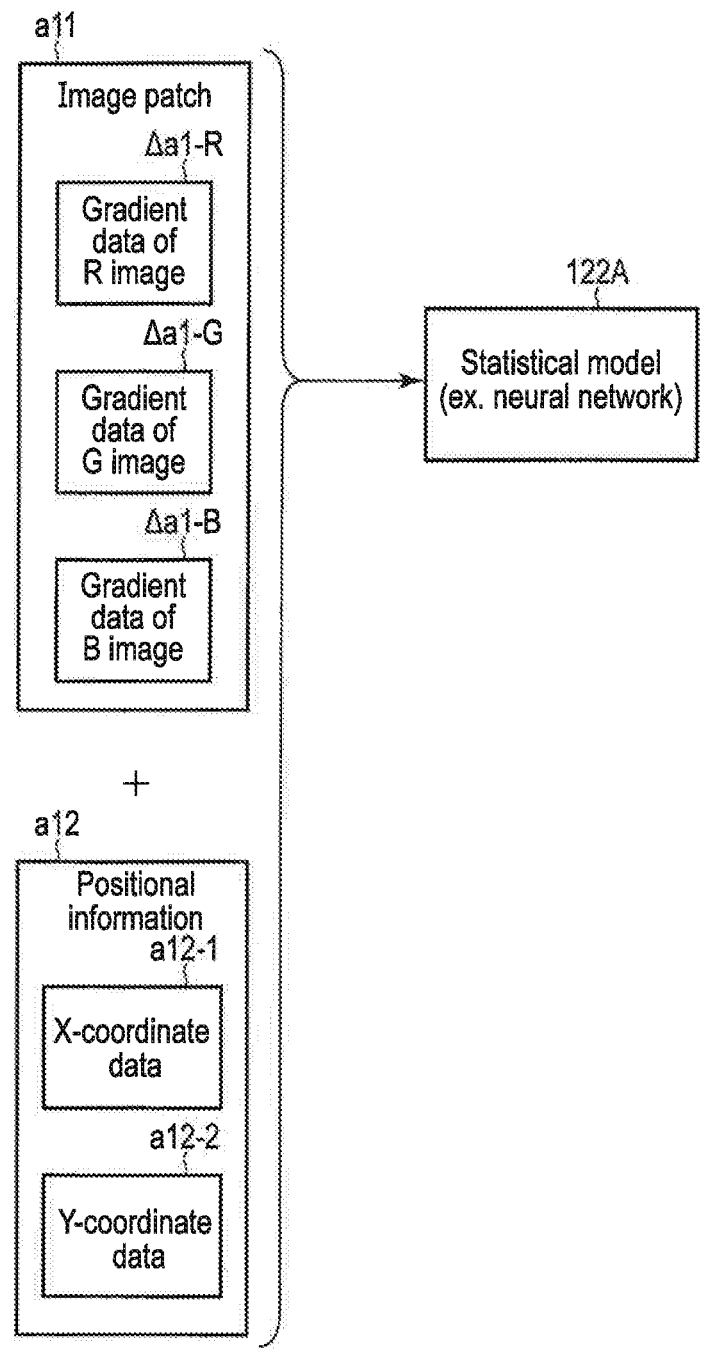
F I G. 12

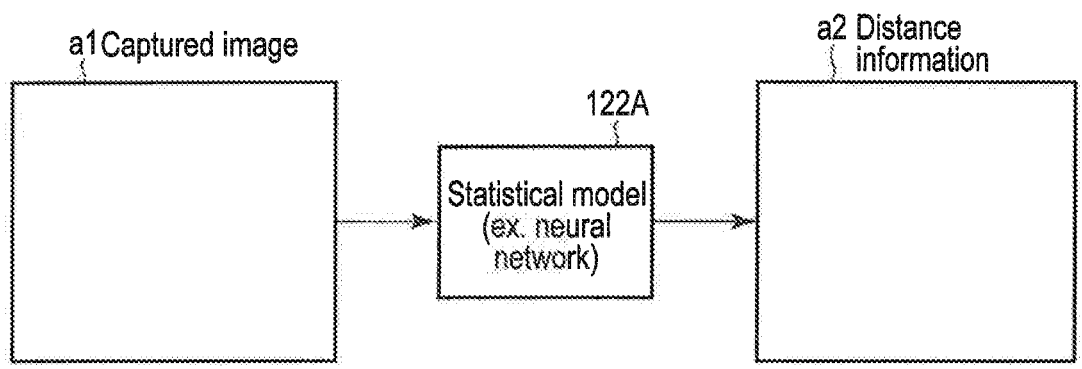
F I G. 13
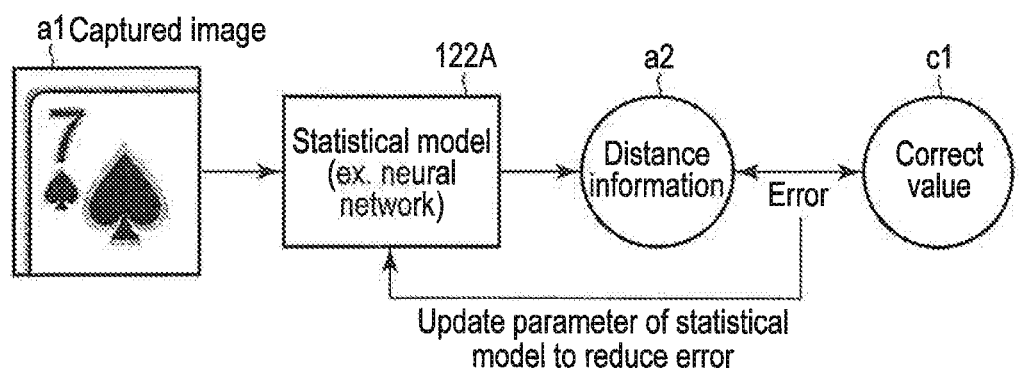
F I G. 14

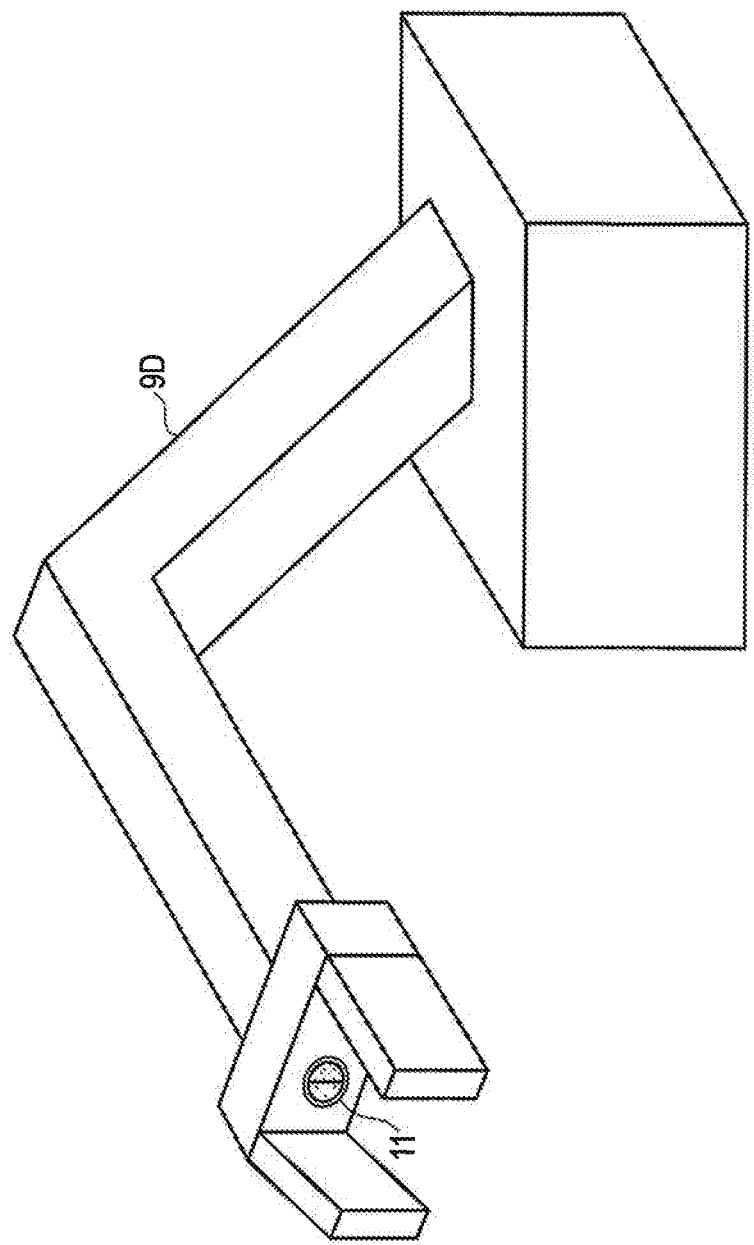
F I G. 25

IMAGE PROCESSING APPARATUS, RANGING APPARATUS AND PROCESSING APPARATUS

CROSS-REFERENCE TO RELATED APPLICATIONS

This application is based upon and claims the benefit of priority from Japanese Patent Application No. 2018-151247, filed Aug. 10, 2018, the entire contents of which are incorporated herein by reference.

FIELD

Embodiments described herein relate generally to an image processing apparatus, a ranging apparatus, and a processing apparatus.

BACKGROUND

A technique for obtaining a distance to an object from images captured by two cameras of a stereo camera (binocular camera) is known. Furthermore, there is a technique recently proposed to obtain a distance to an object from images captured at a time by one camera (monocular camera).

Acquisition of the distance to an object from images captured at a time by one camera, does not require multiple shooting, and thus the acquisition can be applied to a moving object. As the method of acquiring the distance to an object from images captured at a time by one camera, there is a method of acquiring distance using blur information. For example, modeling of the blur information enables calculation of the distance. However, in a case where the blur information included in the images deviates from the model, an error in a distance to be calculated is likely to increase.

BRIEF DESCRIPTION OF THE DRAWINGS

FIG. 7 is a diagram illustrating that an image captured by the ranging apparatus to which the image processing apparatus of the embodiment is applied gives a physical cue regarding distance (blur information).

FIG. 8 is a diagram illustrating that the image processing apparatus of the embodiment analyzes the blur information that is the physical cue regarding distance with a statistical model to estimate the distance to an object.

FIG. 12 is a diagram illustrating second exemplary input of information regarding the captured image to the statistical model in the image processing apparatus of the embodiment.

FIG. 13 is a diagram illustrating a third exemplary method of estimating distance information from a captured image with the statistical model (screen batch method) to be applied to the image processing apparatus of the embodiment.

FIG. 14 is a diagram illustrating an exemplary learning method of the statistical model included in the image processing apparatus of the embodiment.

FIG. 25 is a perspective view illustrating an exemplary external appearance of a robot arm including the ranging apparatus to which the image processing apparatus of the embodiment is applied.

DETAILED DESCRIPTION

Embodiments will be described, below with reference to the drawings.

In general, according to one embodiment, an image processing apparatus includes a memory and one or more hardware processors electrically coupled to the memory. The one or more hardware processors acquire a first image of an object including a first shaped blur and a second image of the object including a second shaped blur. The first image and the second image are acquired by capturing at a time through a single image-forming optical system. The one or more hardware processors acquire distance information to the object based on the first image and the second image, with a statistical model that has learnt previously.

First, a structure of a ranging apparatus to which an image processing apparatus according to an embodiment is applied will be described with reference to FIG. 1. The ranging apparatus 1 captures an image, and estimates a distance (also referred to as depth) from an image captured point to an object using the captured image.

The ranging apparatus 1 includes an image capture unit 11 that captures an image and an image processing unit 12 that processes the captured image. The ranging apparatus 1 may be realized as an apparatus provided with the image capture unit 11 and the image processing unit 12, or may be realized as a system including multiple devices such as an image capture apparatus corresponding to the image capture unit 11 and an image processing apparatus corresponding to the image processing unit 12.

Figure 1:
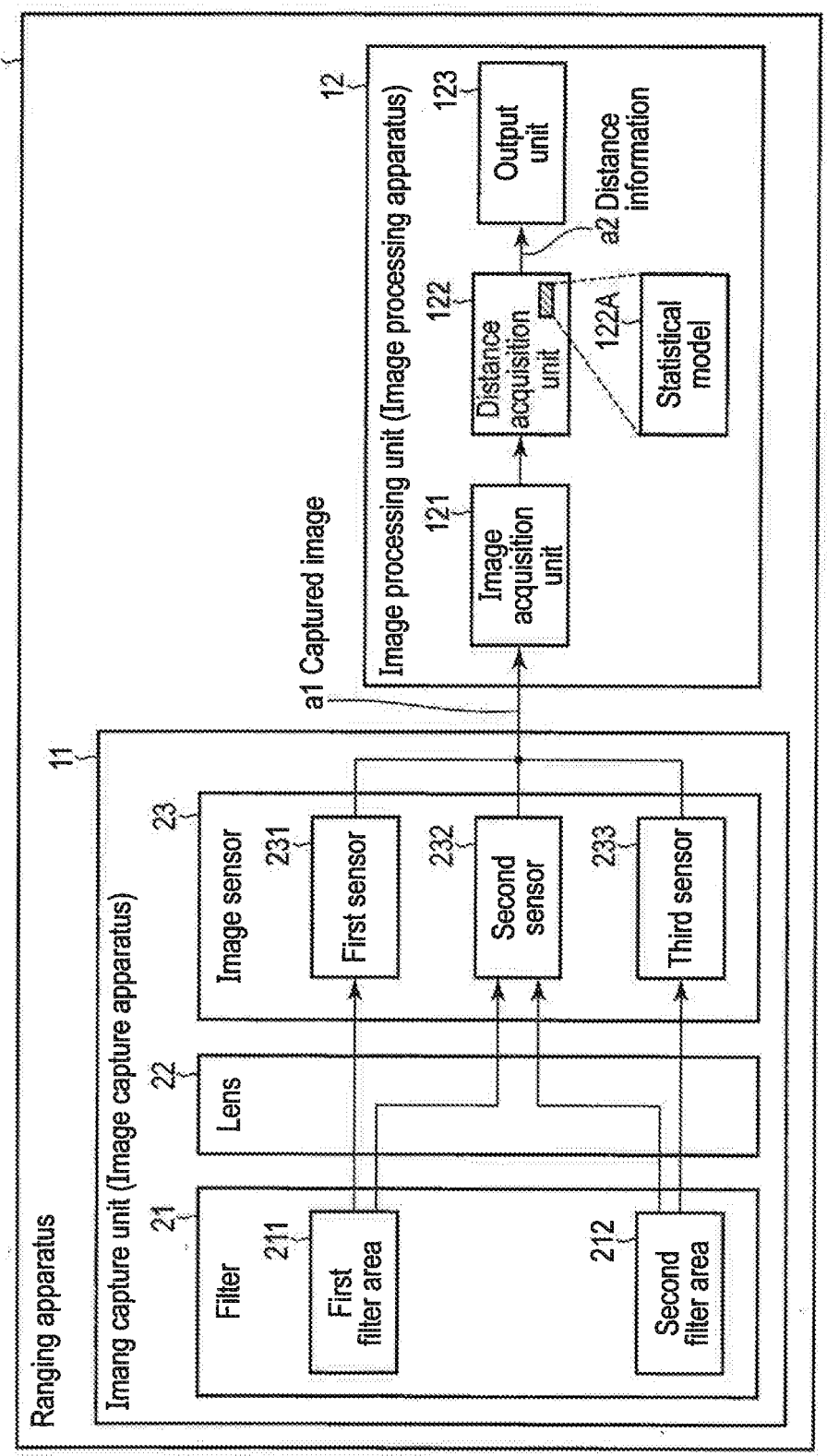
FIG. 1 is a block diagram illustrating a structure of a ranging apparatus to which an image processing apparatus (image processing unit) of an embodiment is applied.

As illustrated in FIG. 1, the image capture unit 11 includes a monocular camera provided with a filter 21, a lens 22 and an image sensor 23. The filter 21 includes filter areas that transmit light rays having different wavelength bands (color components). The filter 21 includes, for example, filter areas of two colors: a first filter area 211 and a second filter area 212.

The image sensor 23 receives the light rays penetrating the filter 21 and the lens 22, and converts the received light rays into electrical signals (photoelectric conversion). Examples of the image sensor 23 include a charge coupled device (CCD), and a complementary metal oxide semiconductor (CMOS). The image sensor 23 includes at least two kinds of imaging elements and is provided with, for example, a first sensor 231 including imaging elements that receive red (R) light rays, a second sensor 232 including imaging elements that receive green (G) light rays, and a third sensor 233 including imaging elements that receive blue (B) light rays. Each imaging element receives light rays having a corresponding wavelength band, and converts the received light rays into electrical signals. The electrical signals are converted by A/D conversion so as to generate a color image. Hereinafter, color component images (also referred to as wavelength component images) which are images of an R component, a G component, and a B component are also referred to as an R image, a G image, and a B image, respectively. It should be noted that the R, G, and B images can also be generated with the electrical signals for each of the red, green, and blue imaging elements. In other words, the image capture unit 11 can generate at least one of the color images: the R, G, and B images, by one-time capturing (one shot).

Figure 2:
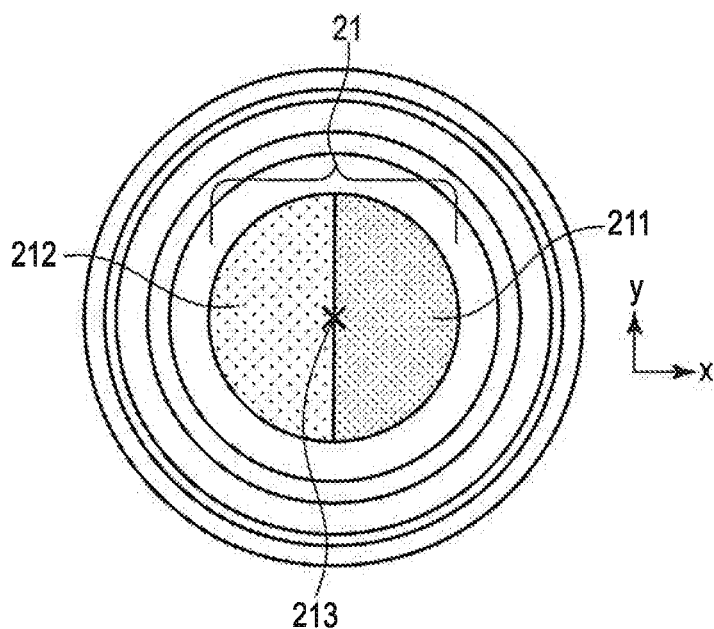
FIG. 2 is a view illustrating an exemplary structure of a filter disposed in an image capture apparatus (image capture unit) in the ranging apparatus to which the image processing apparatus of the embodiment is applied.

Next, FIG. 2 illustrates an exemplary structure of the filter 21. The filter 21 has the filter areas that transmit light rays having different wavelength bands (color components), and two or more filter areas are point-asymmetric with respect to an optical center 213 of an image capture apparatus 2. The filter 21 includes, for example, filter areas of two colors: the first filter area 211 and the second filter area 212. The center of the filter 21 corresponds to the optical center 213 of the image capture apparatus 2 (lens 22). Each of the first filter area 211 and the second filter area 212 has a shape point-asymmetric with respect to the optical center 213. For example, the two filter areas 211 and 212 do not overlap, and the two filter areas 211 and 212 constitute the entire area of the filter 21. In the example illustrated in FIG. 2, each of the first filter area 211 and the second filter area 212 has a semicircular shape formed by dividing the circular filter 21 by a line through the optical center 213. For example, the first filter area 211 is a yellow (Y) filter area, and the second filter area 212 is a cyan (C) filter area. It should be noted that the first filter area 211 may be a magenta (M) filter area, and the second filter area 212 may be a yellow (Y) filter area. Furthermore, the first filter area 211 may be a cyan (C) filter area, and the second filter area 212 may be a magenta (M) filter area.

Those color filters transmit different wavelength bands. A part of a wavelength band of light rays that penetrates one filter area may have, for example, an overlap with a part of a wavelength band of light rays that penetrates another color filter area. A wavelength band of light rays that penetrates one color filter area may include, for example, a wavelength band of light rays that penetrates another color filter area.

It should be noted that each of the first filter area 211 and the second filter area 212 may be a filter that changes transmittance of any wavelength bands, or a polarized filter that allows light rays polarized in any directions to pass therethrough. Alternatively, each filter area may be a microlens that changes light-condensing power of any wavelength bands. The filter that changes transmittance of any wavelength bands may be, for example, a primary color filter (RGB), a complementary color filter (CMY), a color correction filter (CC-RGB/CMY), an infrared/ultraviolet cut filter, an ND filter, or a masking shield. In a case where the first filter area 211 and the second filter area 212 are microlenses, the lens 22 brings about biasing distribution of condensed light rays, which changes blur shapes.

For sake of simplicity, hereinafter mainly illustrated is a case where the first filter area 211 is a yellow (Y) filter area and the second filter area 212 is a cyan (C) filter area in the filter 21 illustrated in FIG. 2.

For example, the filter 21 illustrated in FIG. 2 being provided to an aperture of the camera configures a color aperture having a structure in which the aperture is divided into halves by two colors. Based on light rays that penetrate the color aperture, the image sensor 23 generates an image. The lens 22 may be disposed between the filter 21 and the image sensor 23 on an optical path of the light rays incident upon the image sensor 23. The filter 21 may be disposed between the lens 22 and the image sensor 23 on the optical path of the light rays incident upon the image sensor 23. In a case where lenses 22 are provided, the filter 21 may be disposed between two lenses 22.

Light rays having a wavelength band corresponding to the second sensor 232 penetrate both the first filter area 211 of yellow color and the second filter area 212 of cyan color. Light rays having a wavelength band corresponding to the first sensor 231 penetrate the first filter area 211 of yellow color and do not penetrate the second filter area 212 of cyan color. Light rays having a wavelength band corresponding to the third sensor 233 penetrate the second filter area 212 of cyan color and do not penetrate the first filter area 211 of yellow color.

The fact that light rays having a certain wavelength band penetrate a filter or a filter area represents that the filter or the filter area transmits the light rays having the wavelength band with high transmittance, and the fact represents that attenuation of the light rays having the wavelength band due to the filter or the filter area (a decrease in light intensity) is extremely small. Furthermore, the fact that light rays having a certain wavelength band do not penetrate a filter or a filter area represents that the light rays are shielded by the filter or the filter area: for example, the filter or the filter area transmits the light rays having the wavelength band with low transmittance, and the fact represents that attenuation of the light rays having the wavelength band due to the filter or the filter area is extremely large. For example, a filter or a filter area absorbs light rays having a certain wavelength band so as to attenuate the light rays.

Figure 3:
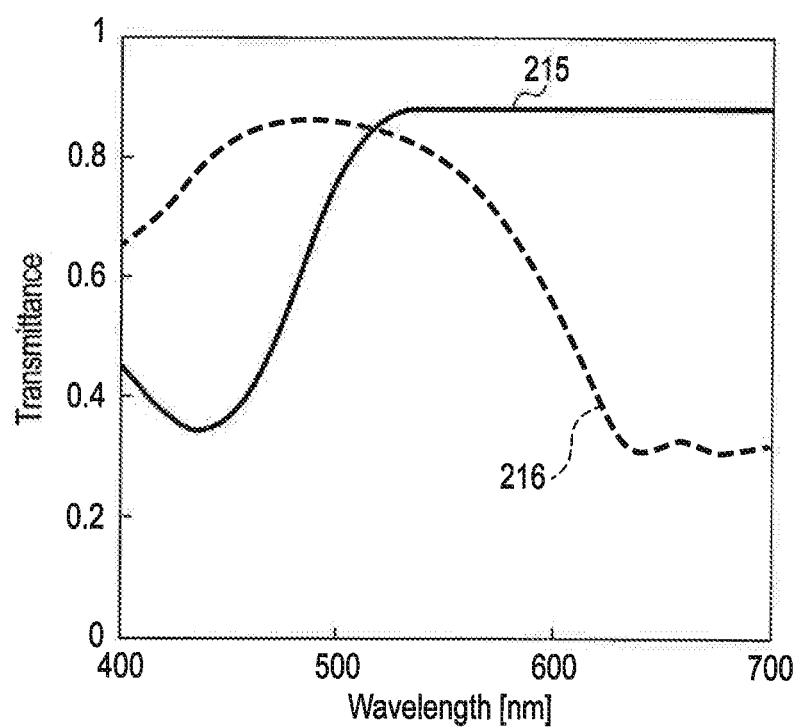
FIG. 3 is a diagram illustrating exemplary transmittance characteristics of the filter in FIG. 2.

FIG. 3 illustrates exemplary transmittance characteristics of the first filter area 211 and the second filter area 212. Although transmittance with respect to light rays having a wavelength band longer than 700 nm in wavelength bands of visible light is not illustrated, it should be noted that the transmittance is close to transmittance with respect to a wavelength band of 700 nm. In a transmittance characteristic 215 of the first filter area 211 of yellow color illustrated in FIG. 3, light rays having wavelength bands from about 620 nm to 750 nm corresponding to the R image and light rays having wavelength bands from about 495 nm to 570 nm corresponding to the G image are transmitted with high transmittance, and light rays having wavelength bands from about 450 nm to 495 nm corresponding to the B image are hardly transmitted. In a transmittance characteristic 216 of the second filter area 212 of cyan color, the light rays having the wavelength bands corresponding to the B image and the light rays having the wavelength bands corresponding to the G image are transmitted with high transmittance, and the light rays having the wavelength bands corresponding to the R image are hardly transmitted.

Therefore, the light rats having the wavelength bands corresponding to the R image (the first sensor 231) penetrate the first filter area 211 of yellow color, and the light rays having the wavelength bands corresponding to the B image (the third sensor 233) penetrate the second filter area 212 of cyan color. The light rays having the wavelength bands corresponding to the G image (the second sensor 232) penetrate the first filter area 211 and the second filter area 212.

These R and B images and blur shapes on the images change in accordance with a distance d to an object, more specifically, in accordance with a difference between the distance d and a focusing distance df. The focusing distance df is a distance from an image-capturing position to a focused position where an image is not blurred (that is, a position in focus). The filter areas 211 and 212 have a shape point-asymmetric with respect to the optical center 213 so that the blur shapes on the R and B images differ and slant depending on situations whether the object is on the near side or on the deep side from the focusing distance df. Directions of the slant in the blurs on the R and B images reverse depending on the situations whether the object is on the near side or the deep side from the focusing distance df as seen from the image-capturing position.

Figure 4:
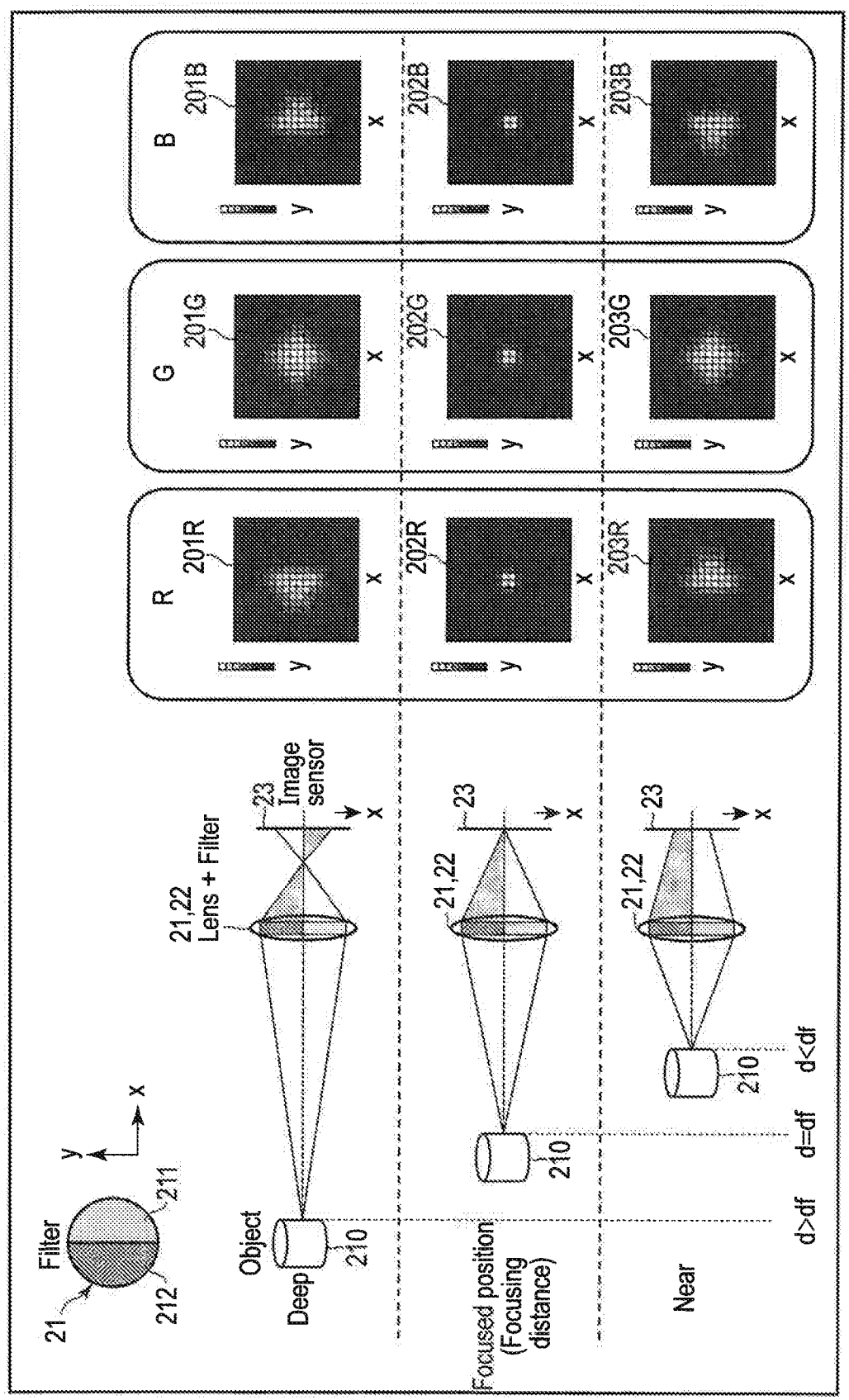
FIG. 4 is a diagram describing changes in light rays and blur shapes due to a color aperture provided with the filter in FIG. 2.

With reference to FIG. 4, hereinafter described are changes in light rays and blur shapes due to the color aperture provided with the filter 21.

In a case where an object 210 is on the deep side from the focusing distance df (d>df), images captured by the image sensor 23 are blurred. The shape of the blur in the image varies between the R image, the G image, and the B image. For example, the shape of the blur in the R image (201R) is biased to the left, the shape of the blur in the G image (201G) is not biased, and the shape of the blur in the B image (201B) is biased to the right. The blur increases in size as the object 210 moves from the focusing distance df to the deep side. Use of the difference (gradient) in pixel value between adjacent pixels, enables detection of the blur.

When the object 210 is at the focusing distance df (d=df), images captured by the image sensor 23 are hardly blurred. The shape of the blur in the image is substantially constant between the R image, the G image, and the B image. The shape of the blur in the R image (202R), the shape of the blur in the G image (202G), and the shape of the blur in the B image (202B) are not biased.

When the object 210 is on the near side from the focusing distance df (d<df), images captured by the image sensor 23 are blurred. The shape of the blur in the image varies between the R image, the G image, and the B image. For example, the shape of the blur in the R image (203R) is biased to the right, the shape of the blur in the G image (203G) is not biased, and the shape of the blur in the B image (203B) is biased to the left. The blur increases in size as the object 210 moves from the focusing distance df to the near side.

In this manner, when the object 210 is on the near side or on the deep side from the focusing distance df, the shape of the blur in the R image (201R or 203R), based on the light beam that has penetrated through the first filter area 211 for yellow, is asymmetrical, and the shape of the blur in the B image (201B or 203B), based on the light beam that has penetrated through the second filter area 212 for cyan, is asymmetrical. The shape of the blur in the R image (201R or 203R) is different from the shape of the blur in the B image (201B or 203B). The blur increases in size as the object 210 moves away from the focusing distance df.

Meanwhile, as illustrated in FIG. 1, the image processing unit 12 includes an image acquisition unit 121, a distance acquisition unit 122, and an output unit 123. The image processing unit 12 is realized, for example, as an embedded system built in a computer or various types of electric equipment. The image processing unit 12 may be partially or entirely realized by software (program) or by hardware (electronic circuit).

The image acquisition unit 121 acquires at least the R image and the B image in which the shape of the blur is biased to the left or the right, from the color image, the R image, the G image, and the B image generated by the image capture unit 11 (captured image a1). Here, it is assumed that the image capture unit 11 generates the R image, the G image, and the B image, and the image acquisition unit 121 acquires the three images.

The distance acquisition unit 122 acquires the distance to the object, with at least the R image and the B image in which the shape of the blur is biased to the left or the right, acquired by the image acquisition unit 121. More specifically, the distance acquisition unit 122 acquires the distance to the object from at least two images of the R image and the B image, with a statistical model 122A that has learnt previously. The statistical model 122A can adopt various known machine-learning algorithms, such as a neural network and a random forest. Here, it is assumed that the distance acquisition unit 122 acquires the distance to the object with three images of the R image, the G image, and the B image. Acquisition of the distance by the statistical model 122A with the three images of the R image, the G image, and the B image, will be described in detail later.

The output unit 123 outputs the distance (distance information a2) acquired by the distance acquisition unit 122, for example, in a map format in which the distance is disposed positionally in association with the image. For example, the output unit 123 outputs the distance acquired in units of pixels as image data in which the pixel value indicates the distance. In a case where the distance is output as the image data, use of the image data enables display of a distance image indicating the distance in color. Use of the distance output from the output unit 123 enables, for example, calculation of the size of the object.

Figure 5:
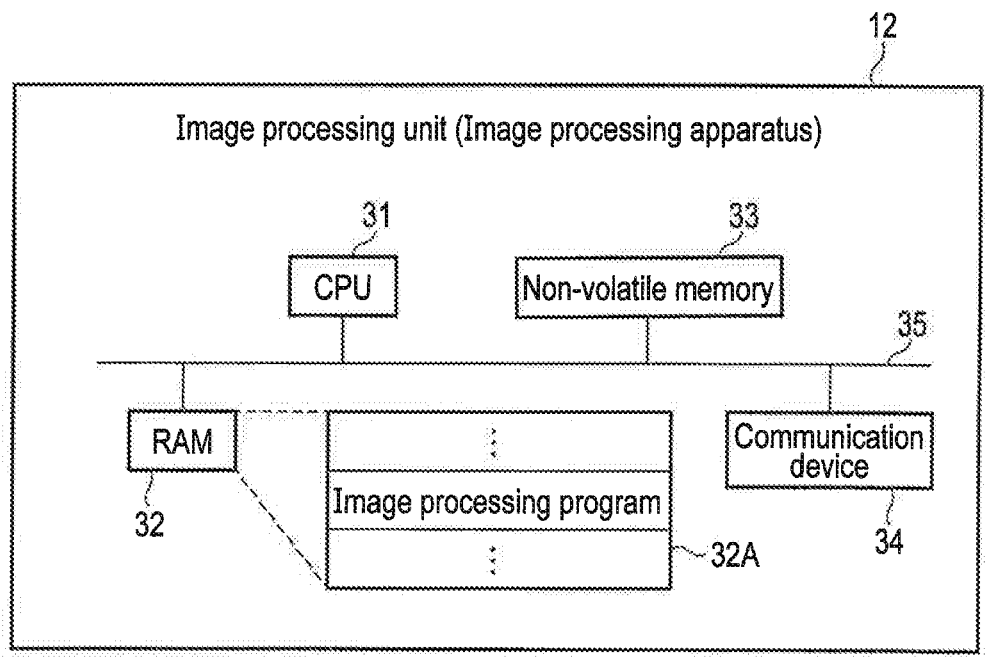
FIG. 5 is a block diagram illustrating an exemplary system structure of an image processing unit (image processing apparatus) in the ranging apparatus of the embodiment.

FIG. 5 illustrates a system structure of the image processing unit (image processing apparatus) 12. The image processing unit 12 includes a CPU 31, a RAM 32, a nonvolatile memory 33, and a communication unit 34. The image processing unit 12 also includes a bus 35 that mutually connects the CPU 31, RAM 32, nonvolatile memory 33, and communication unit 34.

The CPU 31 controls operations of various components in the image processing unit 12. The CPU 31 may be a single processor or may include multiple processors. The CPU 31 executes various programs loaded from the nonvolatile memory 33 into the RAM 32. These programs include an operating system (OS) and various application programs. The application program includes an image processing program 32A. The image processing program 32A includes a command group for estimating the distance to the object with the image in which the object is captured. The RAM 32 is a storage medium used as a main storage device. The nonvolatile memory 33 is a storage medium used as an auxiliary storage device.

The communication unit 34 is a device configured to execute wire communication or wireless communication. The communication unit 34 includes a transmitter that transmits a signal and a receiver that receives a signal. The communication unit 34 executes, for example, communication with an external device over a network, and communication with an external device on the periphery. An example of the external device includes the image capture unit 11 (image capture apparatus). Therefore, the communication unit 34 may receive an image from the image capture unit 11.

Figure 6:
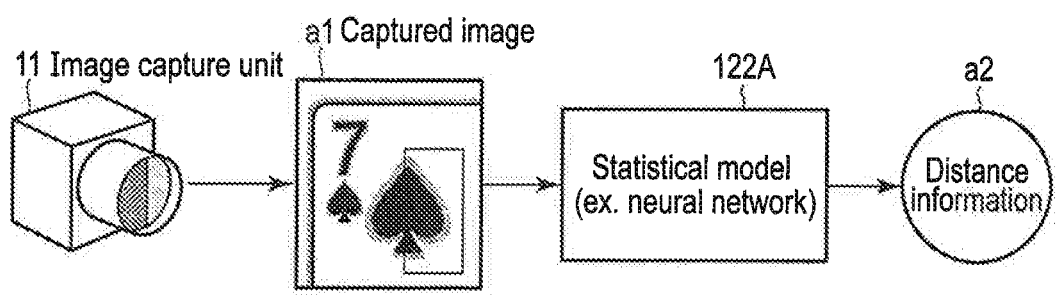
FIG. 6 is a diagram illustrating a basic structure regarding distance detection from an image in the image processing apparatus of the embodiment.

FIG. 6 is a diagram illustrating a basic structure regarding distance detection from the image in the ranging apparatus 1 to which the image processing apparatus (image processing unit 12) of the present embodiment is applied.

The ranging apparatus 1 generates a plurality of images each including a blur occurring in a different shape, with the image capture unit 11 including the filter 21 including the plurality of filter areas through which light in the mutually different wavelength bands penetrates (captured image a1). The image processing unit 12 inputs information regarding the plurality of images into the statistical model 122A that has learnt previously. The image processing unit 12 acquires the distance to the object through the statistical model 122A (distance information a2).

FIG. 7 is a diagram illustrating that the plurality of images each including a blur occurring in a different shape generated by the image capture unit 11 including the filter 21 including the plurality of filter areas through which light in the mutually different wavelength bands penetrates (captured image a1), gives a physical cue regarding distance (blur information b1).

As described with reference to FIG. 4, in a case where the object 210 is located on the deep side of focused position, the shape of the blur in the R image (blur information b1) is biased to the left and the shape of the blur in the B image (blur information b1) is biased to the right in the plurality of images (captured image a1) generated by reception of the light that has penetrated through the filter 21 and the lens 22, by the image sensor 23. Meanwhile, in a case where the object 210 is located on the near side of the focused position, the shape of the blur in the R image (blur information b1) is biased to the right and the shape of the blur in the B image (blur information b1) is biased to the left in the plurality of images (captured image a1) generated by reception of the light that has penetrated through the filter 21 and the lens 22, by the image sensor 23.

That is, because the direction in which the blur is biased on each of the R image and the B image is reversed depending on whether the object 210 is located on the near side or the deep side of the focused position, in the plurality of images generated by the image capture unit 11 of the image processing apparatus 1 according to the present embodiment, first, the color of the blur (shape) enables recognition of whether the object 210 is located on the deep side or the near side of the focused position.

Because the blur increases in size as the object 210 moves away from the focused position, second, the size of the blur enables acquisition of the distance from the focused position to the object 210. When distinction of whether the object 210 is located on the deep side or the near side of the focused position can be made and acquisition of the distance from the focused position to the object 210 can be made, the distance from the shooting point to the object 210 can be acquired.

Thus, the plurality of images each including a blur occurring in a different shape generated by the image capture unit 11 including the filter 21 including the plurality of filter areas through which light in the mutually different wavelength bands penetrates (captured image a1), gives the physical cue regarding distance (blur information b1).

FIG. 8 is a diagram illustrating that the image processing apparatus 1 of the present embodiment analyzes with the statistical model 122A the blur information b1 that is the physical cue rewarding distance in the captured image a1 to estimate the distance to the object 210 (distance information a2).

As described with reference to FIG. 7, the blur (blur information b1) on each of the plurality of images (captured image a1) generated by the image capture unit 11 of the image processing apparatus 1, results in the physical cue regarding distance to the object 210. Specifically, the color (shape) or the size of the blur results in a cue regarding the distance to the object 210. The image processing unit 12 of the image processing apparatus 1, more specifically, the distance acquisition unit 122 analyzes, with the statistical model 122A, the blur information b1 that is the physical cue, in the captured image a1, to estimate the distance to the object 210 (distance information a2).

Figure 9:
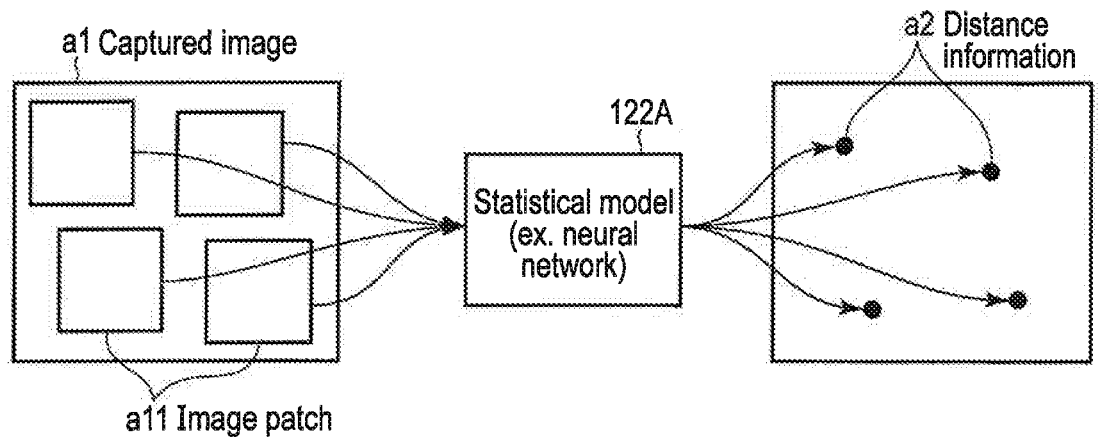
FIG. 9 is a diagram illustrating a first exemplary method of estimating distance information from a captured image with the statistical model (patch method) to be applied to the image processing apparatus of the embodiment.

FIG. 9 is a diagram illustrating a first exemplary method of estimating the distance information a2 from the captured image a1 with the statistical model 122A (patch method) to be applied to the image processing apparatus 1 of the present embodiment.

In the first exemplary method, the distance acquisition unit 122 extracts local areas (image patches a11) from the captured image a1, and inputs information regarding the captured image a1 into the statistical model 122A every local area, to estimate the distance information a2. For extraction of the local areas, for example, the entire area of the captured image a1 may be divided in a matrix and then the divided partial areas may be extracted in succession, or the captured image a1 may be recognized and then a plurality of local areas may be extracted so as to cover an area in which the object image is detected. A local area may overlap partially with another local area.

Meanwhile, the statistical model 122A into which the information regarding the captured image a1 is input every local area, estimates the distance every pixel for the local area. In a case where overlapping local areas are extracted, for the overlap, for example, an average value may be calculated, or a value may be determined by majority decision (in a case where not less than three local areas overlap).

Figure 10:
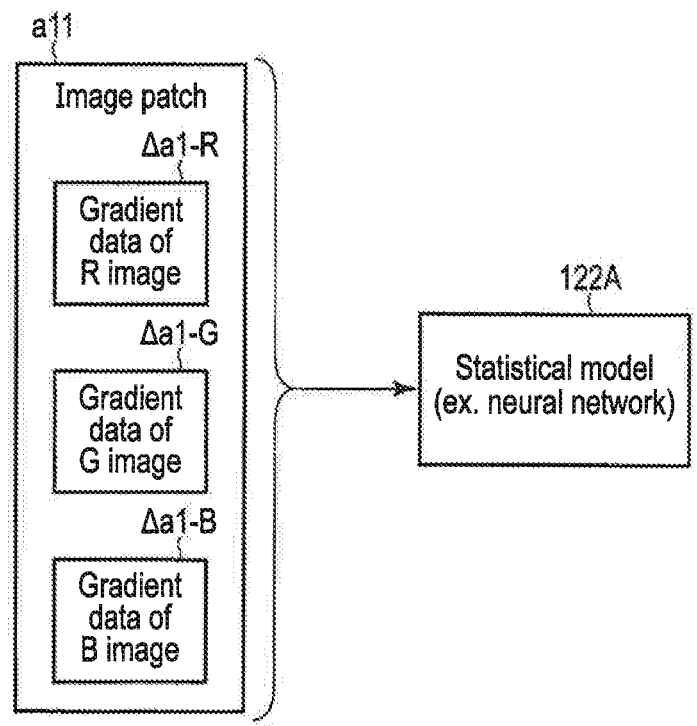
FIG. 10 is a diagram illustrating first exemplary input of information regarding the captured image to the statistical model in the image processing apparatus of the embodiment.

FIG. 10 is a diagram illustrating exemplary input of the information regarding the captured image a1, to the statistical model 122A in the first exemplary method.

The distance acquisition unit 122 that extracts the local areas (image patches a11) from the captured image a1, generates gradient data Δa1 (Δa1-R, Δa1-G, and Δa1-B) of each local area for the R image, the G image, and the B image, and then inputs the gradient data Δa1 into the statistical model 122A. The gradient data Δa1 indicates the difference in pixel value between each pixel and the adjacent pixel. For example, in a case where each local area is extracted as a rectangular area of n pixels (X-axis direction)×m pixels (Y-axis direction), the distance acquisition unit 122 generates the gradient data Δa1 in which the calculated difference value between each pixel in the local area and, for example, the right adjacent pixel is disposed in a matrix of n rows×m columns, and inputs the gradient data Δa1 into the statistical model 122A. The statistical model 122A extracts the distance information from the blur, with the gradient data Δa1-R of the R image, the gradient data Δa1-G of the G image; and the gradient data Δa1-B of the B image. Note that, theoretically, input of any of a pair of the gradient data Δa1-R of the R image and the gradient data Δa1-G of the G image, a pair of the gradient data Δa1-G of the G image and the gradient data Δa1-B of the B image, and a pair of the gradient data Δa1-B of the B image and the gradient data Δa1-R of the R image, enables determination of the distance from the degree of bias in the pair. Thus, the condition of extracting the distance information from the blur is satisfied.

Figure 11:
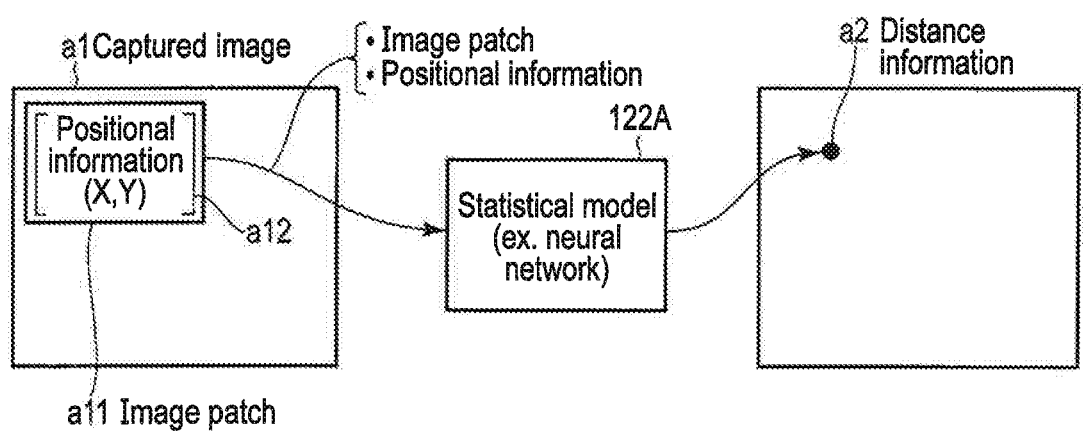
FIG. 11 is a diagram illustrating a second exemplary method of estimating distance information from a captured image with the statistical model to be applied to the image processing apparatus of the embodiment.

FIG. 11 is a diagram illustrating a second exemplary method of estimating the distance information a2 from the captured image a1 with the statistical model 122A to be applied to the image processing apparatus 1 of the present embodiment.

In the second exemplary method, as the information regarding the captured image a1, in addition to the input of the gradient data Δa1 every local area (image patch a11) in the first exemplary method, positional information a12 regarding the local area on the captured image a1 is further input into the statistical model 122A. For example, the positional information a12 may correspond to the central point in the local area, may correspond to a previously determined side, such as a left-upper side, or may adopt positional information regarding each pixel on the captured image a1 included in the image patch a11.

For example, in a case where difference occurs between the blur of the object image formed by the light that has penetrated through the central portion of the lens 22 and the blur of the object image formed by the light that has penetrated through the end portion of the lens 22, further input of the positional information a12 into the statistical model 122A can prevent the difference from influencing estimation of the distance. That is the second exemplary method enables the statistical model 122A that has learnt the correlation between the blur, the distance, and the position on the image, to estimate the distance information a2 from the captured image a1, more reliably.

FIG. 12 is a diagram illustrating exemplary input of the information regarding the captured image a1 to the statistical model 122A in the second exemplary method.

For example, in a case where a rectangular area of n pixels (X-axis direction)×m pixels (Y-axis direction) is extracted as a local area, the distance acquisition unit 122 generates X-coordinate data a12-1 in which n×m number of X-coordinate values on the captured image a1, corresponding to, for example, the central point in the local area are disposed in a matrix of n rows×m columns and Y-coordinate data a12-2 in which n×m number of Y-coordinate values on the captured image a1, corresponding to, for example, the central point in the local area are disposed in a matrix of n rows×m columns, and then inputs the X-coordinate data a12-1 and the Y-coordinate data a12-2 together with the gradient data Δa1 (Δa1-R, Δa1-G, and Δa1-B), into the statistical model 122A.

FIG. 13 is a diagram illustrating a third exemplary method of estimating the distance information a2 from the captured image a1 with the statistical model 122A (screen batch method) to be applied to the image processing apparatus 1 of the present embodiment. In the third exemplary method, the distance acquisition unit 122 inputs the information regarding the captured image a1 (gradient data Δa1 (Δa1-R, Δa1-G, and Δa1-B) for the entire area of the captured image a1, into the statistical model 122A, without extraction of local areas (image patches a11) from the captured image a1 as in the first exemplary method and the second exemplary method.

In comparison to the first exemplary method and the second exemplary method in which the distance (distance information a2) is estimated every local area, the uncertainty of estimation with the statistical model 122A is likely to rise. However, the load of the distance acquisition unit 122 can be reduced in the third exemplary method in which no local area is extracted from the captured image a1.

FIG. 14 is a diagram illustrating an exemplary learning method of the statistical model 122A included in the image processing apparatus 1 of the present embodiment.

Even in a case where any method of the first exemplary method described with reference to FIG. 9, the second exemplary method described with reference to FIG. 11, and the third exemplary method described with reference to FIG. 13 is applied, the learning method of the statistical model 122A basically includes: inputting the information regarding the captured image a1 into the statistical model 122A; and feeding the error between the distance information a2 estimated by the statistical model 122A and a correct value c1, back to the statistical model 122A. The feedback includes updating a parameter of the statistical model 122A so as to reduce the error.

In a case where the first exemplary method described with reference to FIG. 9 is applied, even during learning of the statistical model 122A, the information regarding the captured image a1 (gradient data Δa1) is input into the statistical model 122A every local area (image patch a1) and the distance information a2 in each pixel in each local area estimated by the statistical model 122A and the correct value c1 are compared. In a case where the second exemplary method described with reference to FIG. 11 is applied, as the information regarding the captured image a1, the positional information a12 regarding each local area on the captured image a1 is further input into the statistical model 122A. In a case where the third exemplary method described with reference to FIG. 13 is applied, the information regarding the captured image a1 (gradient data Δa1) for the entire area is collectively input into the statistical model 122A, and then the distance information a2 in each pixel estimated by the statistical model 122A is compared to the correct value c1.

Figure 15:
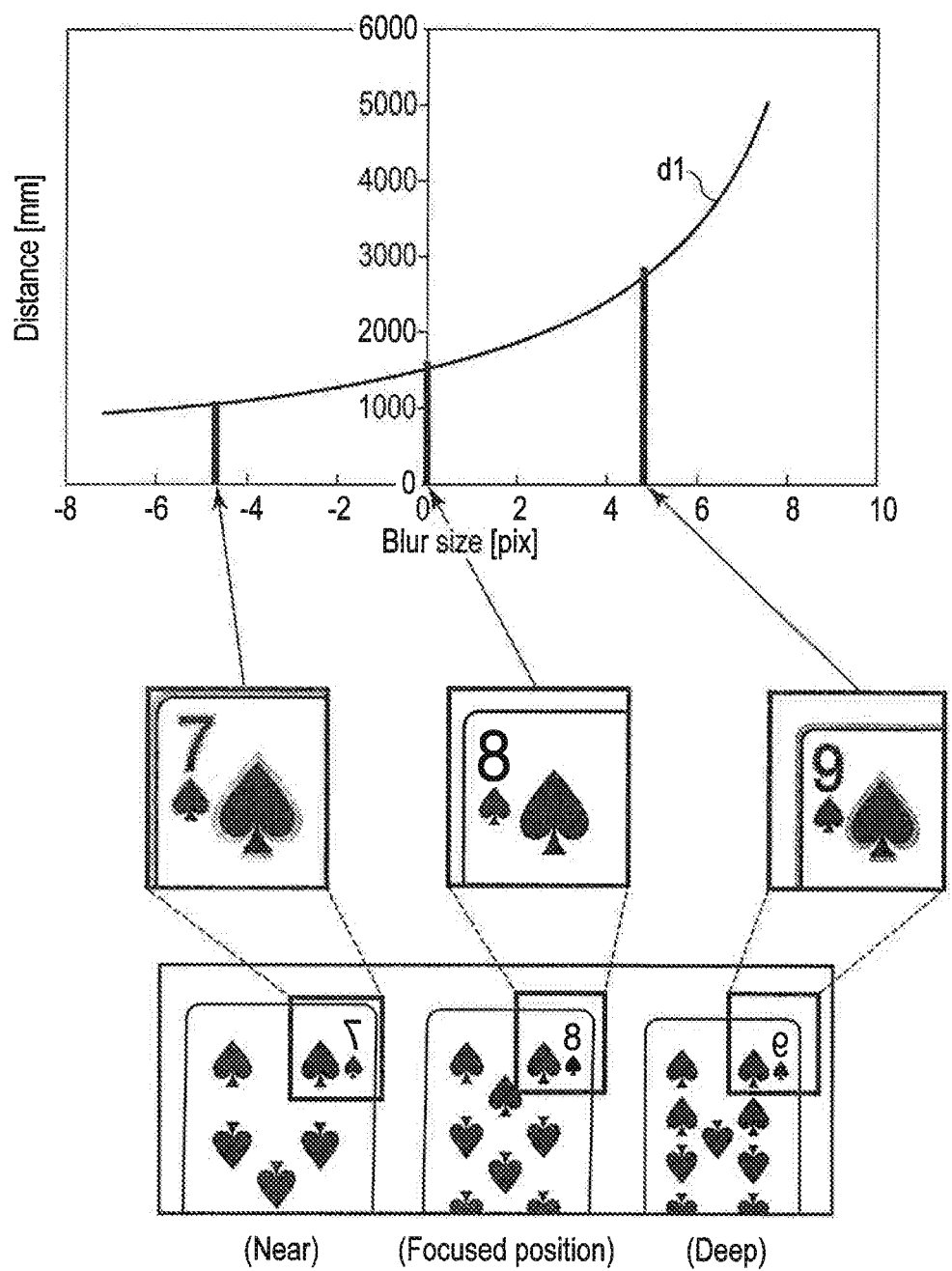
FIG. 15 is a diagram illustrating an exemplary relationship between blur and distance.

FIG. 15 illustrates the relationship between the blur and the distance. FIG. 15 illustrates the size of the blur occurring in a case where the object is located on the near side of the focused position, negatively in value on the X axis and the size of the blur occurring in a case where the object is located on the deep side of the focused position, positively in value on the X axis. That is the color (shape) of the blur is illustrated positively and negatively. In any of the case where the object is located on the near side of the focused position and the case where the object is located on the deep side of the focused position, the absolute value of the size of the blur (pixel) increases as the object moves away from the focused position. In the example of FIG. 15, it is assumed that the focused position is approximately 1500 mm. For example, a blur of approximately 4.8 pixels corresponds to a distance of approximately 1000 mm, a blur of 0 pixels corresponds to a distance of 1500 mm, and a blur of approximately 4.8 pixels corresponds to a distance of approximately 2750 mm.

In a case where the information regarding the captured image a1 is input into the statistical model 122A during learning of the statistical model 122A, the size of the blur in which the color (shape) is indicated positively and negatively, corresponding to the distance to the object in shooting of the captured image a1, is used as the correct value c1. In other words, the statistical model 122A outputs the size of the blur as the distance information a2. Because there is a correlation between the distance and the size of the blur as indicated with the segment d1 of FIG. 15, estimation of the distance and estimation of the size of the blur are synonymous. However, because there is a linear relationship between the captured image a1 and the blur included in the captured image a1, causing the statistical model 122A to estimate the size of the blur enables the accuracy of estimation of the statistical model 122A to be higher than that in causing the statistical model 122A to estimate the distance directly. For example, for input of the information regarding the captured image a1 every local area of n pixels (X-axis direction)×m pixels (Y-axis direction), the statistical model 122A outputs the distance information a2 including the size of the blur estimated for each pixel in the local area, in an arrangement of n rows×m columns.

The correct value c1 is compared to the distance information a2 estimated by the statistical model 122A from the input information regarding the captured image a1. For example, captured images a1 are prepared, in which the object is shot at distances with the finest possible degree from an acquirable lower value in distance (near side) to an acquirable upper value in distance (deep side) in the image processing apparatus 1 according to the present embodiment. The information regarding each captured image a1 is input into the statistical model 122A, and additionally the size of the blur corresponding to the distance to the object in shooting of each captured image a1, is used as the correct value c1. For a captured image a1 for learning of the statistical model 122A, favorably, various captured images a1 each including a different object are prepared.

Figure 16:
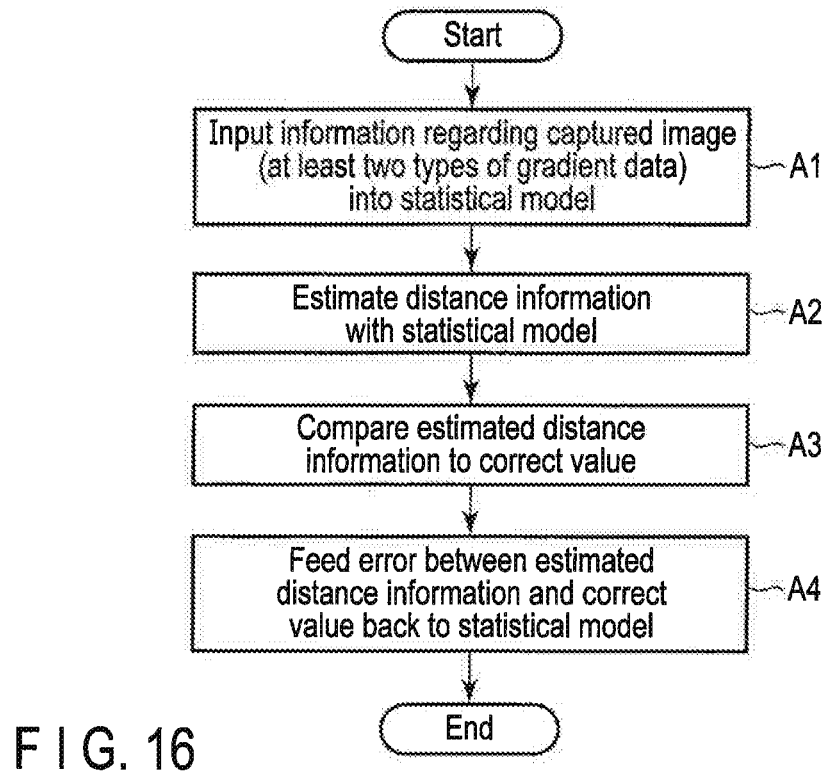
FIG. 16 is a flowchart showing a flow of learning of the statistical model included in the image processing apparatus of the embodiment.

FIG. 16 is a flowchart showing a flow of learning of the statistical model 122A included in the image processing apparatus 1 of the present embodiment.

First, the information regarding the captured image a1, more specifically, not less than two types of gradient data Δa1 including at least the pieces of gradient data of the R image and the B image in which the shape of the blur is biased to the left or the right (Δa1-R and Δa1-B), are input into the statistical model 122A (step A1). In a case where the information regarding the captured image a1 is input every local area (image patch a11) extracted from the captured image a1, the local information a12 regarding the local area, on the captured image a1 may be further input into the statistical model 122A.

After the input of the information regarding the captured image a1 to the statistical model 122A, the statistical model 122A estimates the distance to the object (distance information a2) (step A2). The distance (distance information a2) estimated by the statistical model 122A is compared to the correct value c1 (step A3), and then the error therebetween is fed back to the statistical model 122A (step A4). More specifically, the parameter of the statistical model 122A is updated so as to reduce the error.

Figure 17:
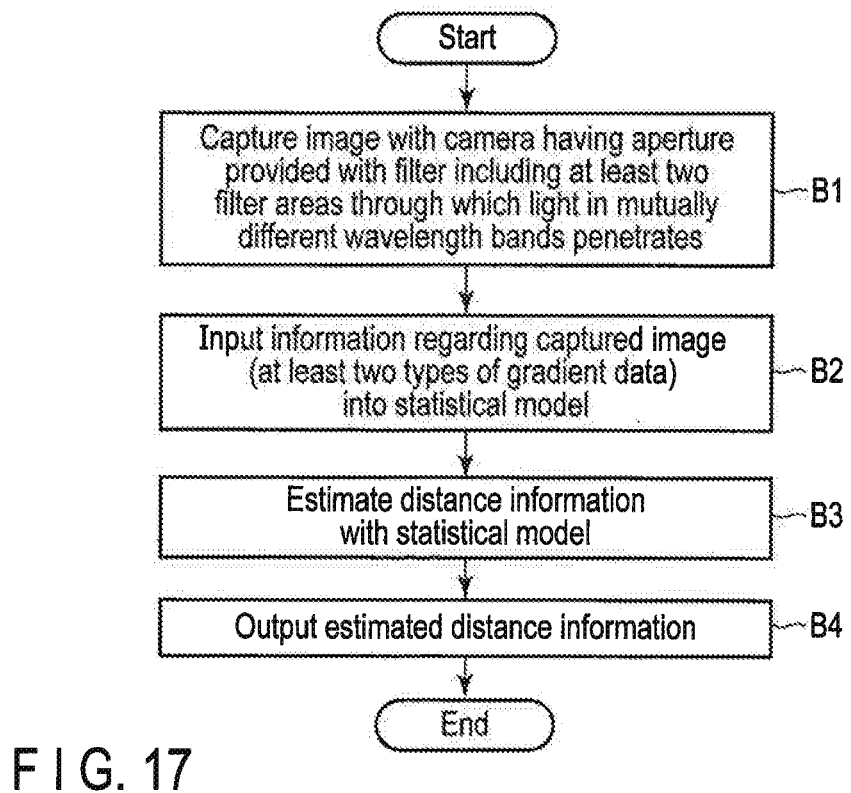
FIG. 17 is a flowchart showing a flow of distance detection from an image with the statistical model in the image processing apparatus of the embodiment.

FIG. 17 is a flowchart showing a flow of acquisition of the distance information a2 from the captured image a1 with the statistical model 122A in the image processing apparatus 1 of the present embodiment.

The image processing apparatus 1 captures an image (captured image a1) with the camera (image capture unit 11) having the aperture provided with the filter 21 including the not less than two filter areas (first filter area 211 and second filter area 212) through which light in the mutually different wavelength bands penetrates (step B1).

The image processing apparatus 1 inputs the information regarding the captured image a1, more specifically, not less than two types of gradient data Δa1 including at least the pieces of gradient data of the R image and the B image in which the shape of the blur is biased to the left or the right (Δa1-R and Δa1-B), into the statistical model 122A (step B2).

After the input of the information regarding the captured image a1 to the statistical model 122A, the statistical model 122A estimates the distance to the object (distance information a2) (step B3). The image processing apparatus 1 outputs the distance (distance information a2) estimated by the statistical model 122A, for example, in the map format in which the distance information a2 is disposed positionally in association with the captured image a1 (step B4).

Thus, in the image processing apparatus 1 according to the present embodiment, the image capture unit 11 generates the captured image a1 including the blur information b1 that is the physical cue regarding distance, and the image processing unit 12 estimates the distance (distance information a2) with the statistical model 122A, on the basis of the information regarding the captured image a1. Because the blur information b1 in the captured image a1 generated by the image capture unit 11 has correlation with the physical distance to the object (distance information a2), robust distance detection can be performed, for example, with no influence of optical illusion. Estimation of the distance (distance information a2) based on statistical information prevents occurrence of a concern in which, in a case where the blur information is modeled to calculate the distance, an error in a distance to be calculated is likely to increase when the blur information included in the image deviates from the model.

Figure 18:
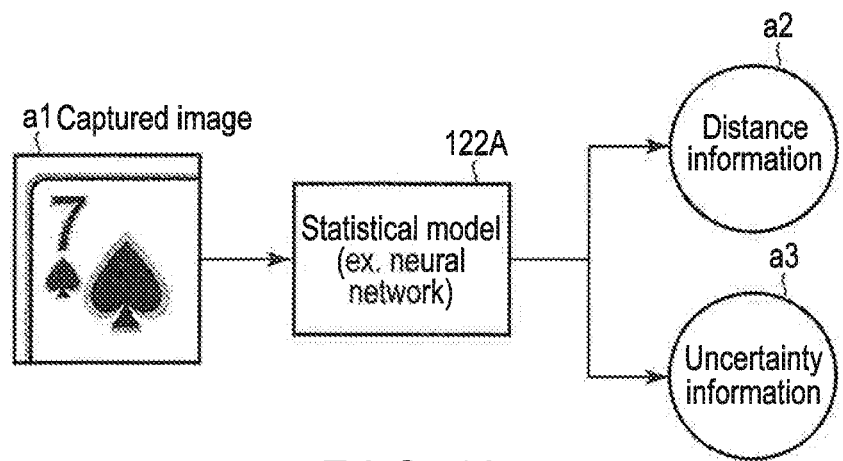
FIG. 18 is an explanatory diagram of an overview of one modification of the image processing apparatus of the embodiment.

Next, a modification of the image processing apparatus 1 of the present embodiment, will be described. FIG. 18 is an explanatory diagram of an overview of the modification.

As illustrated in FIG. 18, according to the modification, in estimation of the distance information a2 from the information regarding the captured image a1 with the statistical model 122A, the degree of uncertainty of the estimation is calculated every pixel, and then the value thereof is output as uncertainty information a3 together with the distance information a2. The method of calculating the degree of uncertainty of the estimation with the statistical model 122A can adopt, but is not limited to a particular method, various known methods.

The distance acquisition unit 122 verifies the uncertainty information a3 output from the statistical model 122A. The distance acquisition unit 122 performs a process, such as destruction of the distance information a2 in a case where the value of the uncertainty information a3 is a threshold value or more, or correction of the distance information a2 in which the value of the uncertainty information a3 is the threshold value or more, with peripheral distance information a2 on the captured image a1, in which the value of the uncertainty information a3 is less than the threshold value. The distance acquisition unit 122 transfers the distance information a2 subjected to the process, to the output unit 123. For the correction, for example, the average value of the peripheral distance information a2 may be used as a correction value, or the correction value may be determined by majority decision. For the destruction, for example, a value indicating-invalidity is disposed at a position corresponding to the pixel.

Thus, according to the modification, furthermore, the distance information a2 having a high degree of uncertainty of the estimation, can be prevented from being used directly.

Figure 19:
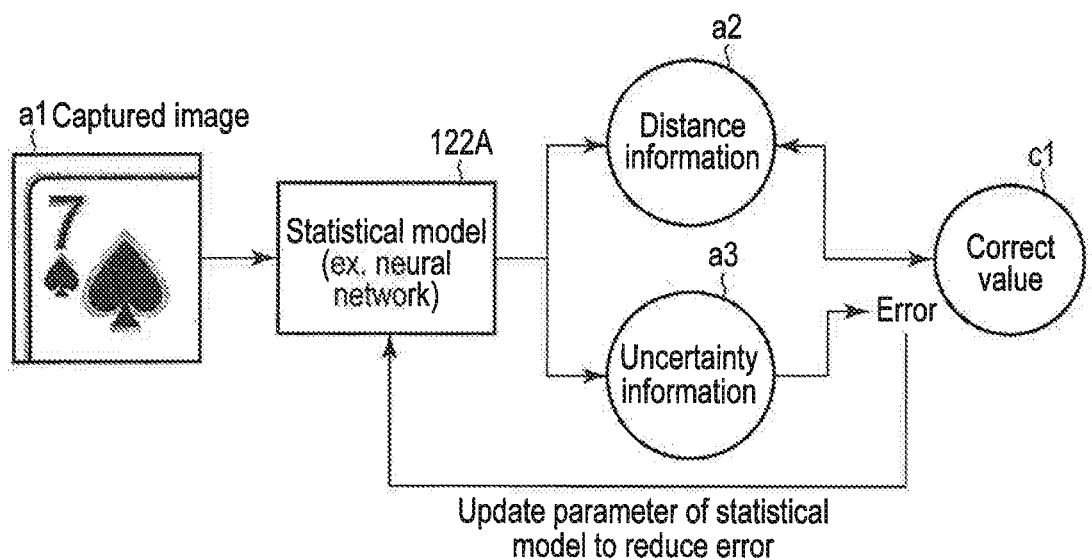
FIG. 19 is a diagram illustrating an exemplary learning method of the statistical model according to one modification of the image processing apparatus of the embodiment.

FIG. 19 is a diagram illustrating an exemplary learning method of the statistical model 122A according to the modification. As illustrated in FIG. 19, in the present modification in which the statistical model 122A outputs the uncertainty information a3, basically, the information regarding the captured image a1 is input into the statistical model 122A, and then the error between the distance information a2 estimated by the statistical model 122A and the correct value c1, is fed back to the statistical model 122A. In learning of the uncertainty, use of the error between the distance information and the correct value, divided by the square of the uncertainty, enables reduction of deviation during learning. Note that, because rendering the uncertainty infinite enables the error to result in zero, the square of the uncertainty is added as a penalty to the error. That is the parameter of the statistical model 122A is updated so as to reduce the value in which the error between the estimated distance information a2 and the correct value c1 is corrected with the uncertainty. Furthermore, according to the modification, no learning deviation can be made with the uncertainty information a3. For example, in a case where there is no error between the estimated distance information a2 and the correct value c1 but the degree of uncertainty of the estimation indicated by the uncertainty information a3 is high, there is a possibility that the distance information a2 has been estimated accidentally. Thus, it can be recognized that learning is insufficient for the distance.

Figure 20:
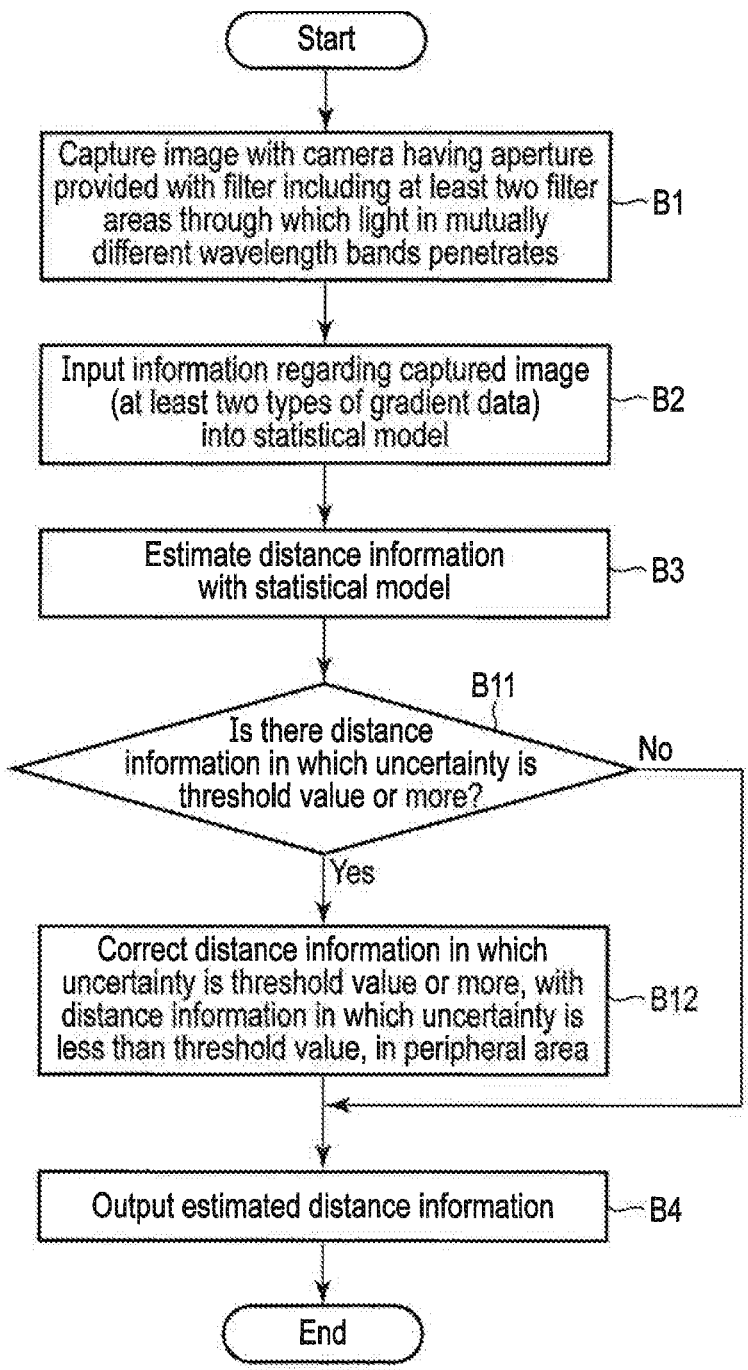
FIG. 20 is a flowchart showing a flow of distance detection from an image with the statistical model according to one modification of the image processing apparatus of the embodiment.

FIG. 20 is a flowchart showing a flow of acquisition of the distance information a2 from the captured image a1 with the statistical model 122A according to the modification.

The difference from the flowchart of FIG. 16 described above, will be described. First, at step B3, the statistical model 122A outputs the uncertainty information a3 regarding the estimated distance (distance information a2).

Step B11 and step B12 are performed between step B3 and step B4. That is the image processing apparatus 1 verifies whether there is an estimated distance in which the uncertainty is the threshold value or more (step B11). In a case where there is the estimated distance (step B11: YES), the image processing apparatus 1 corrects the distance in which the uncertainty is the threshold value or more, with a peripheral distance in which the uncertainty is less than the threshold value, on the captured image a1 (step B12). Note that the image processing apparatus 1 may remove the distance in which the uncertainty is the threshold value or more.

Thus, output of the uncertainty information a3 by the statistical model 122A enables no learning deviation during learning and enables prevention of direct use of a wrongly estimated distance in operation.

EXAMPLE OF APPLICATION

Hereinafter described are some examples to which the ranging apparatus 1 having the aforementioned structure is applied.

Figure 21:
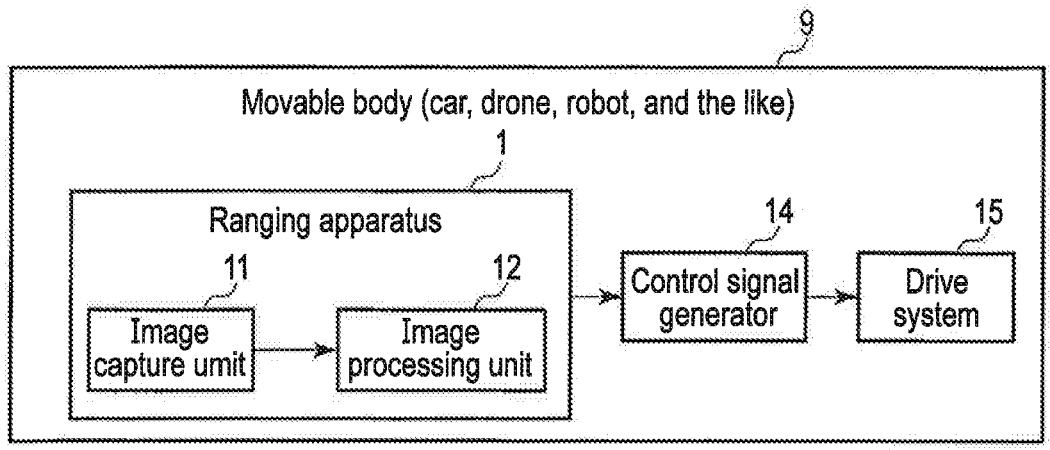
FIG. 21 is a block diagram illustrating a structure of a movable body including the ranging apparatus to which the image processing apparatus of the embodiment is applied.

FIG. 21 illustrates an exemplary functional structure of a movable body (processing apparatus) 9 including the ranging apparatus 1. The movable body 9 can be realized, for example, as a car having a self-driving function, an unmanned aerial vehicle, and an autonomous mobile robot. Examples of the unmanned aerial vehicle include an airplane, a rotary wing aircraft, a glider, or an airship that a person cannot board. The unmanned aerial vehicle can fly by remote control or on autopilot, and examples thereof include a drone (multicopter), a radio control plane, and a helicopter for spraying agricultural chemicals. An example of the autonomous mobile robot includes a mobile robot such as an automated guided vehicle (AGV), a cleaning robot used for floor cleaning, and a communication robot that provides various kinds of information to visitors. In addition to the examples in which the robot itself moves, the movable body 9 may also be an industrial robot having a drive system for moving and rotating a part of the robot such as a robot arm.

As illustrated in FIG. 21, the movable body 9 includes, for example, the ranging apparatus 1, a control signal generator 14, and a drive system 15. Among the components disposed in the ranging apparatus 1, at least the image capture unit 11 is installed, for example, so as to capture an object in a traveling direction of the movable body 9 or a part thereof.

Figure 22:
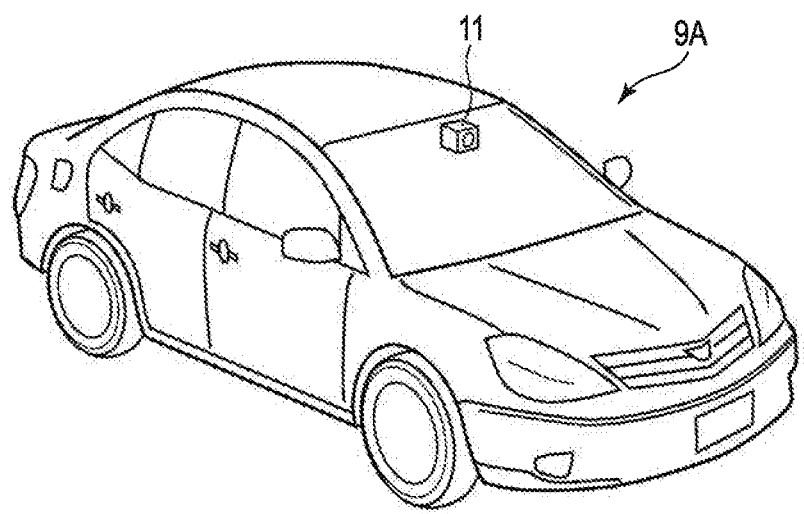
FIG. 22 is a perspective view illustrating an exemplary external appearance of a car including the ranging apparatus to which the image processing apparatus of the embodiment is applied.

In a case where the movable body 9 is a car 9A as illustrated in FIG. 22, the image capture unit 11 may be installed as what is called a front camera that captures an image in front of the movable body 9, or as what is called a rear camera that captures an image in back of the movable body 9 when backing. It is a matter of course that both of those cameras may be installed. The image capture unit 11 may double as what is called a drive recorder. In other words, the image capture unit 11 may be a video recorder.

Figure 23:
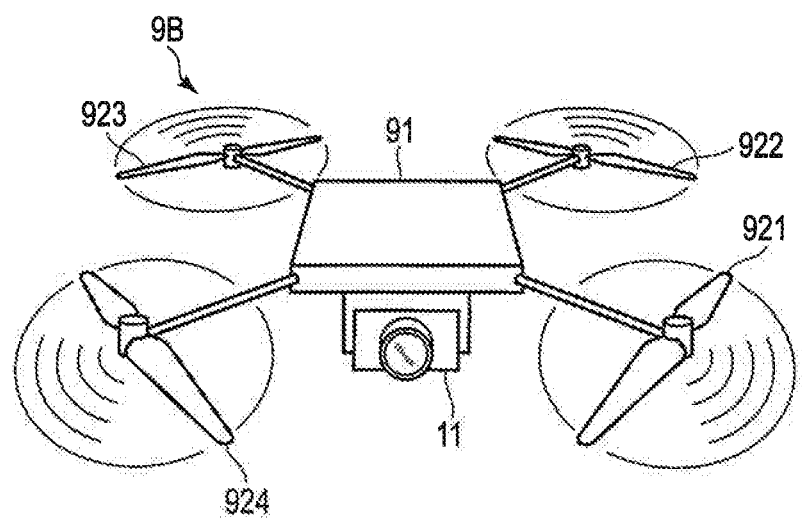
FIG. 23 is a perspective view illustrating an exemplary external appearance of a drone including the ranging apparatus to which the image processing apparatus of the embodiment is applied.

FIG. 23 illustrates another example in a case where the movable body 9 is a drone 9B. The drone 9B includes a drone body 91 corresponding to the drive system 15 and four propeller units 921, 922, 923, and 924. Each of the propeller units 921, 922, 923, and 924 includes a propeller and a motor. Transmitting drive of the motor to the propeller rotates the propeller, and the drone 9B floats due to lifting force caused by the rotation. The image capture unit 11 (or the ranging apparatus 1 including the image capture unit 11) is mounted on, for example, a lower part of the drone body 91.

Figure 24:
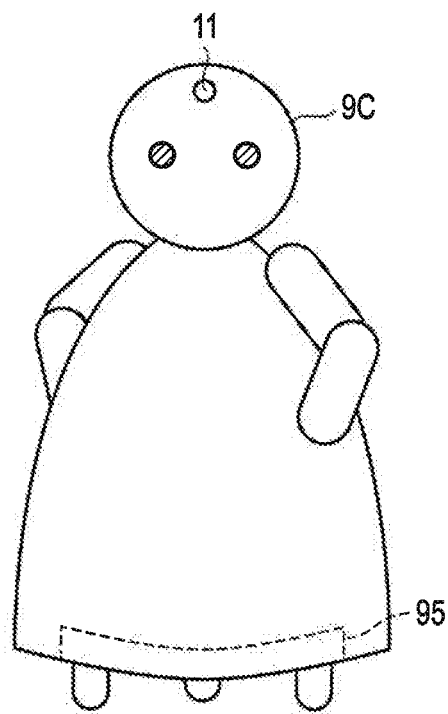
FIG. 24 is a perspective view illustrating an exemplary external appearance of a robot including the ranging apparatus to which the image processing apparatus of the embodiment is applied.

FIG. 24 illustrates another example in a case where the movable body 9 is an autonomous mobile robot 9C. A power output unit 95 including a motor, wheels, and the like, corresponding to the drive system 15 is provided to a lower part of the mobile robot 9C. The power output unit 95 controls rotation frequency of the motor and postures of the wheels. Transmitting drive of the motor to the wheels rotates the wheels in contact with a road surface or a floor surface. As the postures of the wheels are controlled, the mobile robot 9C can move in any direction. The image capture unit 11 may be installed, for example, on the head of the humanoid mobile robot 9C so as to capture an image in front of the mobile robot 9C. It should be noted that the image capture unit 11 may be installed so as to capture an image in back of, or right/left side of the mobile robot 9C. Alternatively, the image capture unit 11 may be installed in plural so as to capture images in multiple directions. Furthermore, a small robot having less space for mounting a sensor and the like may be provided with at least the image capture unit 11 so as to estimate a self-position, a self-posture, and a position of an object, thereby performing dead reckoning.

In a case of controlling movement and rotation of a part of the movable body 9, the image capture unit 11 may be installed at a leading end and the like of a robot arm 9D, as illustrated in FIG. 25, so as to capture an object held by the robot arm 9D. The image processing unit 12 estimates a distance to an object which is to be held. Accordingly, the robot arm 9D can perform an accurate operation to hold the object.

The control signal generator 14 outputs a control signal to control the drive system 15 based on the distance to the object output from the ranging apparatus 1. The drive system 15 drives the movable body 9 or a part of the movable body 9 by the control signal. The drive system 15 performs, for example, at least one of the following operations: operations to move, rotate, accelerate, or decelerate the movable body 9 or a part thereof, an operation to increase or decrease thrust (lifting force) of the movable body 9 or a part thereof, an operation to change a traveling direction, an operation to switch between a normal operation mode and an automatic operation mode (collision avoidance mode), or an operation to activate a safety device such as an air bag. In a case where a distance from the self-position to the object is less than a threshold, the drive system 15 may perform, for example, at least one of the following operations: operations to move, rotate, accelerate, increase, or decrease thrust (lifting force), an operation to change directions so as to face a direction in which the movable body 9 approaches an object, or an operation to switch from the automatic operation mode (collision avoidance mode) to the normal operation mode.

The drive system 15 of the car 9A is, for example, a tire. The drive system 15 of the drone 9B is, for example, a propeller. The drive system 15 of the mobile robot 9C is, for example, leg units. The drive system 15 of the robot arm 9D is, for example, a support unit that supports the leading end provided with the image capture unit 11.

The movable body 9 may further include a speaker or a display in which information relating to the distance to the object from the image processing unit 12 is input. The speaker and the display output sounds or images relating to the distance to the object. The speaker and the display are connected to the ranging apparatus 1 through wire or wirelessly. The movable body 9 may also include a light emitting unit in which the information relating to the distance to the object from the image processing unit 12 is input. The light emitting unit is configured to, for example, turn on or off a light in accordance with the information relating to the distance to the object from the image processing unit 12.

It should be noted that the image processing unit 12 of the ranging apparatus 1 may use an estimated position of the image capture unit 11 and a map created by a device other than the ranging apparatus 1 and input to the ranging apparatus 1 (for example, a map for car navigation) so as to estimate the position of the image capture unit 11 on the map. The movable body 9 may be provided with a GPS receiver (not illustrated) to receive GPS signals and to detect a position in a GPS coordinate system. The map for car navigation is, for example, a map used in a car navigation system provided to a car, including data that indicates objects such as roads, bridges, and buildings obtained based on the GPS coordinate system. The position obtained with the GPS receiver may include an error (for example, an error by several meters) depending on situations at the time of obtaining the GPS signals. Therefore, not only the position obtained with the GPS receiver but also the position of the image capture unit 11 estimated by the ranging apparatus 1 are used so that the self-position on the map can be estimated with higher accuracy. Even in a case where the position cannot be obtained with the GPS receiver due to poor reception of the GPS signals, once the self-position on the map is obtained, then, the image processing unit 12 can continuously estimate the self-position on the map, using the position of the image capture unit 11 continuously estimated by the ranging apparatus 1. Accordingly, it is possible to move the movable body 9 to a target position.

The image processing unit 12 may also complement the map for car navigation, using three-dimensional coordinates of estimated features (that is, three-dimensional coordinates of a captured object on pixels on an image). For example, the image processing unit 12 can repeatedly estimate three-dimensional coordinates of features from captured images continuously obtained while the car is traveling. Accordingly, three-dimensional coordinates of an object not included in the map for car navigation can be added to the map so that a more detailed map can be obtained. Based on the position of the image capture unit 11 on the complemented map, the control signal generator 14 and the drive system 15 can move the movable body 9 (a car, and the like) so as to avoid, for example, a collision.

As another example, in a case where the movable body 9 is a drone, when generating a map (a three-dimensional shape of an object), investigating a structure of a building or terrain, or checking cracks or breakage in an electric wire from the sky, the image capture unit 11 obtains an image of an object and determines whether a distance between a self-position and an object is equal to or more than a threshold. Based on the determination result, the control signal generator 14 generates a control signal for controlling thrust of the drone so that the distance to the object to be inspected is kept constant. Herein, the thrust also includes lifting force. As the drive system 15 operates the drone based on this control signal, the drone can fly in parallel to the object to be inspected. In a case where the movable body 9 is a monitoring drone, a control signal for controlling thrust of the drone may be generated so that a distance to an object to be monitored is kept constant.

When the drones fly, the image capture unit 11 obtains an image shot in a direction toward the ground and determines whether a distance between a self-position and the ground is equal to or more than a threshold. Based on the determination result, the control signal generator 14 generates a control signal for controlling the thrust of the drone so that a height from the ground is set to a specified height. As the drive system 15 operates the drone based on this control signal, the drone can fly at the specified height. In a case where the movable body 9 is a drone for spraying agricultural chemicals, an agricultural chemical can be spread evenly as a height of the drone from the ground is kept constant.

In a case where the movable body 9 is a drone or a car, when drones fly in concert with each other or when cars drive in a row, the image capture unit 11 obtains images shot of surrounding drones or an image of a car in front of the movable body 9, and determines whether distances from a self-position to the surrounding drones or a distance to the foregoing car is equal to or more than a threshold. Based on the determination result, the control signal generator 14 generates a control signal for controlling thrust of the drone or a speed of the car so that the distances to the surrounding drones or the distance to the foregoing car is kept constant. As the drive system 15 operates the drone or the car based on this control signal, the drone can easily fly in concert with other drones or the car can easily drive in a row with other cars. In a case where the movable body 9 is a car, a threshold may be changed as the movable body 9 receives an instruction from a driver through a user interface so that the driver can set the threshold. Accordingly, the driver can drive the car while keeping his/her preferred inter-vehicular distance. Alternatively, in order to maintain a safe inter-vehicular distance to a foregoing car, a threshold may be changed in accordance with the speed of the car. The safe inter-vehicular distance varies depending on the speed of the car. The more the speed of the car increases, the longer the threshold is set. In the case where the movable body 9 is a car, a predetermined distance in a traveling direction is preferably set as a threshold, and the control signal generator 14 is preferably configured to automatically operate a brake or a safety device such as an air bag when an object appears in front of the threshold. In this case, the safety device such as an automatic brake or an air bag is provided to the drive system 15.

In such manners, according to this embodiment, robust distance detection from an image captured at a time by one camera can be performed. Thus, it is possible to easily control operations of the movable body 9 of various types such as a car, a drone, and a robot.

Each of the various functions described in this embodiment may be realized by a circuit (processing circuit). An example of the processing circuit includes a programmed processor such as a central processing unit (CPU). This processor executes computer programs (instructions) stored in a memory so as to execute each of the described functions. The processor may be a microprocessor including an electrical circuit. Examples of the processing circuit include a digital signal processor (DSP), an application specific integrated circuit (ASIC), a microcontroller, a controller, and other electrical circuit components. Each of the components other than the CPU described in this embodiment may also be realized by the processing circuit.

Furthermore, the various procedures in this embodiment can be realized by computer programs. Therefore, as the computer programs are installed in a computer through a storage medium capable of reading the computer storing the computer programs, it is possible to achieve effects similar to those in this embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a memory; and
one or more hardware processors electrically coupled to the memory and configured to:
acquire a first image of an object including a first shaped blur and a second image of the object including a second shaped blur, the first image and the second image being acquired by capturing at a time through a single image-forming optical system;
extract a local area from the first image and the second image;
input information regarding the first image and the second image in the local area and positional information regarding the local area into a statistical model that has learnt previously; and
acquire distance information in the local area based on the input information and the positional information, with the statistical model that has learnt previously.

2. The image processing apparatus of claim 1, wherein:
the single image-forming optical system comprises a filter including a first filter area and a second filter area on an optical path of object light, the first filter area being configured to cause light in a first wavelength band to penetrate through the first filter area and being configured to shield light in a second wavelength band, the second filter area being configured to shield the light in the first wavelength band and being configured to cause the light in the second wavelength band to penetrate through the second filter area;
the first image is captured by a first image sensor configured to receive the light in the first wavelength band to form an object image, and
the second image is captured by a second image sensor configured to receive light in a third wavelength band that has penetrated through the first filter area and the second filter area to form the object image or by a third image sensor configured to receive the light in the second wavelength band to form the object image.

3. The image processing apparatus of claim 1, wherein the statistical model comprises a neural network or a random forest.

4. The image processing apparatus of claim 1, wherein the information regarding the first image and the second image to be input into the statistical model comprises information indicative of a difference in pixel value between each pixel and an adjacent pixel.

5. The image processing apparatus of claim 1, wherein the positional information comprises information indicative of coordinates of a central point of the local area on the first image and the second image.

6. An image processing apparatus comprising:
a memory; and
one or more hardware processors electrically coupled to the memory and configured to:
acquire a first image of an object including a first shaped blur and a second image of the object including a second shaped blur, the first image and the second image being acquired by capturing at a time through a single image-forming optical system; and
acquire distance information to the object based on the first shaped blur of the first image and the second shaped blur of the second image, with a statistical model that has learnt previously,
wherein the statistical model estimates a distance to the object for at least one pixel in the first image and the second image to output the distance information, and outputs uncertainty information regarding the estimated distance.

7. The image processing apparatus of claim 6, wherein the one or more hardware processors is further configured to remove the distance information output together with the uncertainty information indicating that uncertainty is a threshold value or more from the statistical model.

8. The image processing apparatus of claim 6, wherein the one or more hardware processors is further configured to correct the distance information output together with the uncertainty information indicating that uncertainty is a threshold value or more from the statistical model, using peripheral distance information on the first image and the second image output together with the uncertainty information indicating that the uncertainty is less than the threshold value from the statistical model.

9. A ranging apparatus comprising:
an image capture apparatus comprising a single image-forming optical system and configured to capture a first image of an object and a second image of the object by capturing at a time through the single image-forming optical system, the first image including a first shaped blur, the second image including a second shaped blur; and an image processing apparatus comprising:
a memory; and
one or more hardware processors electrically coupled to the memory and configured to:
acquire the first image and the second image;
extract a local area from the first image and the second image;
input information regarding the first image and the second image in the local area and positional information regarding the local area into a statistical model that has learnt previously; and
acquire distance information in the local area based on the input information and the positional information, with the statistical model that has learnt previously.

10. A processing apparatus comprising:
a drive system;
a controller configured to control the drive system; and
a ranging apparatus;
wherein:
the ranging apparatus comprises:
an image capture apparatus comprising a single image-forming optical system and configured to capture a first image of an object and a second image of the object by capturing at a time through the single image-forming optical system, the first image including a first shaped blur, the second image including a second shaped blur; and
an image processing apparatus comprising:
a memory; and
one or more hardware processors electrically coupled to the memory and configured to:
acquire the first image and the second image;
extract a local area from the first image and the second image; input information regarding the first image and the second image in the local area and positional information regarding the local area into a statistical model that has learnt previously; and acquire distance information in the local area based on the input information and the positional information, with the statistical model that has learnt previously, and
the controller is configured to generate a control signal based on the distance information to control the drive system.

* * * * *